(12) United States Patent
Luo et al.

(10) Patent No.: US 11,840,664 B2
(45) Date of Patent: Dec. 12, 2023

(54) METHODS AND COMPOSITIONS FOR ENHANCED OIL RECOVERY

(71) Applicant: KEMIRA OYJ, Helsinki (FI)

(72) Inventors: Yuping Luo, Johns Creek, GA (US); Pengpeng Qi, Atlanta, GA (US)

(73) Assignee: KEMIRA OYJ, Helsinki (FI)

(*) Notice: Subject to any disclaimer, the term of this patent is extended or adjusted under 35 U.S.C. 154(b) by 0 days.

(21) Appl. No.: 17/290,274

(22) PCT Filed: Oct. 31, 2019

(86) PCT No.: PCT/US2019/059042
§ 371 (c)(1),
(2) Date: Apr. 30, 2021

(87) PCT Pub. No.: WO2020/092697
PCT Pub. Date: May 7, 2020

(65) Prior Publication Data
US 2021/0371728 A1   Dec. 2, 2021

Related U.S. Application Data

(60) Provisional application No. 62/753,411, filed on Oct. 31, 2018.

(51) Int. Cl.
*C09K 8/588* (2006.01)
*E21B 43/20* (2006.01)
(Continued)

(52) U.S. Cl.
CPC .............. *C09K 8/592* (2013.01); *C09K 8/594* (2013.01); *E21B 43/20* (2013.01)

(58) Field of Classification Search
CPC .......... C09K 8/58; C09K 8/588; C09K 8/592; C09K 8/594; E21B 43/20; E21B 43/24; E21B 43/16
See application file for complete search history.

(56) References Cited

U.S. PATENT DOCUMENTS 3,421,584 A * 1/1969 Eilers ................. E21B 33/138
166/295
3,795,276 A * 3/1974 Eilers ................. C09K 8/512
166/295
(Continued)

FOREIGN PATENT DOCUMENTS

CA     2758782 A1 * 1/2013 ............... C02F 5/14
NO  20101284 A1 * 11/2010 ............. C09K 8/685
(Continued)

OTHER PUBLICATIONS

Zeynail et al., Alkaline Hydrolysis of Polyacrylamide and Study on Poly(acrylamide-co-sodium acrylate) Properties, 2002, Iranian Polymer Journal, vol. 11 No. 4, 269-275 (Year: 2002).*
(Continued)

*Primary Examiner* — Angela M DiTrani Leff
(74) *Attorney, Agent, or Firm* — Robin L. Teskin; Baker, Donelson, Bearman, Caldwell & Berkowitz PC

(57) ABSTRACT

Methods and compositions comprising one or more degraded in situ gelable polymers are provided. Use of such compositions and methods comprising one or more degraded in situ gelable polymers during enhanced oil recovery may result in an increase in oil production relative to methods and/or compositions which do not comprise one or more degraded in situ gelable polymers.

15 Claims, 2 Drawing Sheets

(51) Int. Cl.
*C09K 8/592* (2006.01)
*C09K 8/594* (2006.01)

(56) References Cited

U.S. PATENT DOCUMENTS

| | | | | |
|---|---|---|---|---|
| 4,069,869 | A * | 1/1978 | Sandiford | C09K 8/512 |
| | | | | 166/270 |
| 4,155,405 | A * | 5/1979 | Vio | C09K 8/887 |
| | | | | 166/295 |
| 4,665,987 | A | 5/1987 | Sandiford et al. | |
| 4,852,652 | A * | 8/1989 | Kuehne | C09K 8/588 |
| | | | | 166/275 |
| 4,994,194 | A * | 2/1991 | Moradi-Araghi | C09K 8/512 |
| | | | | 507/263 |
| 5,617,920 | A * | 4/1997 | Dovan | C09K 8/685 |
| | | | | 524/916 |
| 10,100,174 | B2 * | 10/2018 | Langlotz | C08L 33/26 |
| 2001/0018972 | A1 * | 9/2001 | Bayliss | E21B 33/12 |
| | | | | 166/305.1 |
| 2010/0184630 | A1 | 7/2010 | Sullivan et al. | |
| 2012/0058922 | A1 * | 3/2012 | Favero | C08K 5/005 |
| | | | | 507/225 |
| 2014/0110113 | A1 * | 4/2014 | Bhaduri | C09K 8/512 |
| | | | | 166/292 |
| 2016/0376494 | A1 * | 12/2016 | Li | E21B 43/267 |
| | | | | 166/308.5 |
| 2021/0171825 | A1 * | 6/2021 | May | C09K 8/68 |

FOREIGN PATENT DOCUMENTS

| | | | | |
|---|---|---|---|---|
| WO | | 2010105070 | 9/2010 | |
| WO | | 2010144588 | 12/2010 | |
| WO | WO-2013108174 | A1 * | 7/2013 | C08F 220/56 |
| WO | | 2014082001 | 11/2013 | |

OTHER PUBLICATIONS

Translation of NO 20101284 A1 (Year: 2010).*
Willhite, G. Paul, et al. Development of polymer gel systems to improve volumetric sweep and reduce producing water/oil ratios. University Of Kansas, 2005. Mar. 2006. Retrieved from the Internet <UR: https://www.osti.gov/servlets/purl/823008>; abstract; pp. 8-1, 8-6, 1-2, 4/1-2 8-11, 8-12.
Borchardt, J.K. (2005). Petroleum, Enhanced Oil Recovery. In Kirk-Othmer Encyclopedia of Chemical Technology, (Ed.). https://doi.org/10.1002/0471238961.0514080102151803.a01.pub2.

* cited by examiner

METHODS AND COMPOSITIONS FOR ENHANCED OIL RECOVERY

RELATED APPLICATIONS

This application is a U.S. National Phase application under 35 U.S.C. 371 of Int'l Appl. No. PCT/US2019/059042, filed Oct. 31, 2019, which claims priority to U.S. Provisional Appl. No. 62/753,411, filed Oct. 31, 2018, each and all of which are incorporated herein by reference in their entireties.

FIELD OF THE ART

The present disclosure generally relates to methods and compositions comprising one or more degraded in situ gelable polymers, e.g., wherein said degraded in situ gelable one or more polymers are capable of forming a gel in a desired location. These degraded in situ gelable polymers may be used in various methods, e.g., during enhanced oil recovery, e.g., chemical enhanced oil recovery, and/or during conformance control, e.g., as a conformance control agent, and/or during mobility control, e.g., as a mobility control agent.

BACKGROUND

Enhanced oil recovery (EOR) generally refers to techniques and processes that can be used to increase the amount of unrefined petroleum (for example, crude oil) that may be extracted from an oil reservoir (for example, an oil field). By way of example, using EOR, about 40-60% of the reservoir's original oil can typically be extracted, compared with only 20-40% using traditional primary and secondary recovery techniques (for example, by water injection or natural gas injection). However, many reservoirs from which oil and gas may be produced may be heterogenous in their geologic properties (e.g. porosity and/or permeability). For some reservoirs, permeability differences among the different geologic layers can vary as much as several orders of magnitude In general a fluid, such as water, may be injected into an injection well. The injected water may mobilize and push some of the oil in place to a nearby production well where the oil and injected fluid may be co-produced. A high degree of heterogeneity in the permeability among the geologic layers of rock that contain oil within its porous spaces in the subsurface reservoir may cause such water injections to lack uniformity, with the larger proportion of the water entering into higher permeability geologic layers, which may lead to non-uniform displacement of the oil within the reservoir, such that most of the oil may be quickly mobilized from high permeability layers and little mobilized from the lower permeability layers. Such conditions may result in fluid exiting production wells having a higher than desired percentage of water and a lower than desired percentage of oil. Based on the foregoing, it is desirable to develop compositions and methods for use with EOR processes that improve the recovery of the large volume of oil that may remain in the bypassed and not yet swept lower permeability regions of a reservoir, and that minimize the loss of water from production wells during EOR processes.

BRIEF SUMMARY

The present disclosure generally relates to a method of effecting in situ gelation of one or more degraded in situ gelable polymers at a desired location, comprising (i) providing one or more polyacrylamide-based polymers, wherein said polymers optionally comprise one or more acrylamide monomers and one or more acrylic acid monomers; (ii) contacting an aqueous solution or aqueous composition, such as a brine, with said one or more polymers; (iii) contacting said aqueous solution or composition with one or more degradation agents, which degrade said one or more polymers into one or more polymers comprising reduced molecular weight fragments; (iv) contacting said aqueous solution or composition with one or more cross-linkers comprising a glyoxal and/or a glyoxalating agent; (v) optionally adjusting the pH of said solution or composition to a desired value by adding one or more buffers, such as an alkaline buffer; (vi) introducing or injecting the resultant degraded in situ gelable polymer containing solution or composition into a desired location where in situ gelation of said one or more degraded in situ gelable polymers is to occur; and (vii) allowing for or providing conditions at the desired location which permit gelation of the one or more degraded in situ gelable polymers to occur over time. In some embodiments, said desired location may be an anaerobic environment. In some embodiments, said desired location may be substantially free of oxygen. In some embodiments, said degraded in situ gelable containing solution or composition may be substantially free of oxygen. In some embodiments, said degraded in situ gelable containing solution or composition may be sparged e.g., sparged with nitrogen. In some embodiments, said degraded in situ gelable containing solution or composition comprises one or more oxygen scavengers, e.g., said oxygen scavengers comprise one or more compounds comprising sulfite and/or bisulfite. In some embodiments, said polyacrylamide-based polymer may be provided in dry form. In some embodiments, said polyacrylamide-based polymer may comprise one or more acrylamide monomers and one or more acrylic acid monomers. In some embodiments, said polyacrylamide-based polymer may comprise one or more anionic monomers. In some embodiments, said polyacrylamide-based polymer may comprise any one or more of the following: acrylic acid, beta-carboxyethyl acrylate, sodium 1-allyloxy-2-hydroxy propane sulphonate, 3-Allyloxy-2-hydroxypropane sulfonate sodium salt, vinylsulfonic acid sodium salt. acrylamide tertiary butyl sulfonic acid (also known as 2-acrylamido-2-methylpropane sulfonic acid or N-t-butyl acrylamide sulfonic acid) ("ATBS"); vinylsulfonic acid; 4-styrenesulfonic acid. In some embodiments, step (iv) may occur before, during, or after step (iii). In some embodiments, step (iii) may occur before step (iv), and optionally wherein a one hour incubation period occurs after step (iii) and before step (iv). In some embodiments, step (iv) may occur before step (iii). In some embodiments, step (iv) may occur during step (iii). In some embodiments, step (iv) may occur after step (iii). In some embodiments, step (v) may occur after steps (i)-(iv). In some embodiments, step (iv) may occur before and during step (iii). In some embodiments, step (iv) may occur during and after step (iii). In some embodiments, step (iv) may occur before, during, and after step (iii).

In some embodiments, gelation may occur after a desired amount of time. In some embodiments, gelation may occur after 5 days or less, 5 days or more, 6 days or more, 7 days or more, 8 days or more, 9 days or more, 10 days or more, 11 days or more, 12 days or more, 13 days or more, 14 days or more, 3 weeks or less, 3 weeks or more, 4 weeks or more, 5 weeks or more, 6 weeks or more, 7 weeks or more, or 8 weeks or more. In some embodiments, at least one of said one or more polymers of step (i) may have a molecular weight of about 10 million Da or less, about 11 million Da or less, about 12 million Da or less, about 13 million Da or less, about 14 million Da or less, about 15 million Da or less, or about 15 million Da or more. In some embodiments, step (iii) may result in at least one of said one or more polymers having a molecular weight of about 1 million Da or less, about 2 million Da or less, about 3 million Da or less, about 4 million Da or less, about 5 million Da or less, about 6 million Da or less, or more than about 6 million Da. In some embodiments, the degradation agent may comprise one or more of the following: iron II sulfate, persulfates, peroxides, sodium chlorite, tin (II) chloride, percarbonates, a ferrous compound, a ferrous salt, a ferric compound, a ferric salt, a ferrous salt having an organic anion, a ferrous salt having an inorganic anion, ferrous chloride, ferrous bromide, ferrous fluoride, ferrous sulfate, ammonium iron sulfate, a ferric salt having an organic anion, a ferric salt having an inorganic anion, ferric citrate, ferric chloride, ferric bromide, ferric fluoride, ferric sulfate, ammonium sulfate, ammonium persulfate, enzymes, copper compounds, ethylene glycol, glycol ethers, and combinations or mixtures thereof. In some embodiments, said degradation agent may comprise iron (II). In some embodiments, said degradation agent may comprise iron (II) sulfate. In some embodiments, crosslinking of said one or more degraded in situ gelable polymers may occur following introduction into a desired location. In some embodiments, the degradation agent may comprise iron II sulfate. In some embodiments, step (iv) may comprise adding 5 wt % or less, 10 wt % or less, 15 wt % or less, 20 wt % or less, 25 wt % or less, 30 wt % or less, 35 wt % or less, 40 wt % or less, 45 wt % or less, 50 wt % or less, 55 wt % or less, 60 wt % or less, 65 wt % or less, 70 wt % or less, 75 wt % or less, 80 wt % or less, or 80 wt % or more of said glyoxal and/or glyoxalating agent to said aqueous solution or aqueous composition, e.g., wherein the wt % is a dry weight percentage. In some embodiments, the desired location or solution or composition comprising the degraded in situ gelable polymers may comprise one or more conditions or constituents which favor or permit gelation of the degraded in situ gelable polymers over time, e.g., wherein said conditions or constituents include the molecular weight of the degraded in situ gelable polymers; polymer concentration of the degraded in situ gelable polymers in the solution or at the location where gelation is to occur; crosslinker dosage or concentration; and alkalinity of the degraded in situ gelable polymer containing solution or of the environment where the degraded in situ gelable polymer containing solution is introduced. In some embodiments, after gelation the resultant gelation viscosity or gel strength may approximate that of a non-degraded glyoxalated polyacrylamide ("GPAM") gel, e.g., the resultant gelation viscosity or gel strength and the non-degraded glyoxalated polyacrylamide ("GPAM") gelation viscosity or gel strength may be about $10^2$ cPs or less, about $10^2$ cPs or more, about $10^3$ cPs or more, about $10^4$ cPs or more, or about $10^5$ cPs or more. In some embodiments. In some embodiments, the polyacrylamide-based polymers; prior to degradation and/or in situ gelation; comprises a backbone comprising a molecular weight of 10 to 15 million. In some embodiments, the resultant gelation viscosity or gel strength and the non-degraded glyoxalated polyacrylamide ("GPAM") gelation viscosity or gel strength may be about $10^2$ cPs or less, about $10^2$ cPs or more, about $10^3$ cPs or more, about $10^4$ cPs or more, or about $10^5$ cPs or more. In some embodiments, the resultant gels may be stable for 1 month or less, 1 month or more, 2 months or more, 3 months or more, 4 months or more, 5 months or more, or 6 months or more. In some embodiments, the amount of degradation agent used to contact said aqueous solution or composition may be an amount that results in at least one of said one or more polymers having a molecular weight between about 1 million and about 6 million Da. In some embodiments, the viscosity of the aqueous solution or aqueous composition which comprises said one or more degraded in situ gelable polymers prior to gelation and/or introduction into said desired location may have a viscosity of about 5 cPs or less, about 6 cPs or less, about 7 cPs or less, about 8 cPs or less, about 9 cPs or less, about 10 cPs or less about 12.5 cPs or less, about 15 cPs or less, about 20 cPs or less, about 25 cPs or less, about 30 cPs or less, about 35 cPs or less, about 40 cPs or less, about 45 cPs or less, about 50 cPs or less, about 55 cPs or less, about 60 cPs or less, about 65 cPs or less, about 70 cPs or less, about 75 cPs or less, about 80 cPs or less, about 85 cPs or less, about 90 cPs or less, about 95 cPs or less, about 100 cPs or less, or about 100 cPs or more. In some embodiments, the viscosity of the aqueous solution or aqueous composition which comprises one or more degraded in situ gelable polymers may increase once introduced into a desired location relative to its viscosity prior to introduction. In some embodiments, the viscosity of an aqueous solution or aqueous composition which comprises one or more degraded in situ gelable polymer may be about $10^2$ cPs or less, about $10^2$ cPs or more, about $10^3$ cPs or more, about $10^4$ cPs or more, or about $10^5$ cPs or more after a desired amount of time has passed following introduction of said solution or composition into said desired location.

Furthermore, the present disclosure generally relates to a method of enhanced oil recovery, comprising: a. introduction of one or more in degraded in situ gelable polymers into a desired location, b. gelation of said one or more degraded in situ gelable polymers, thereby forming a gel in said desired location, and optionally c. performing one or more polymer floods and/or one or more waterfloods. The present disclosure also generally encompasses a method of enhanced oil recovery, comprising a. introduction of one or more degraded in situ gelable polymers into a desired location; b. formation of a gel comprising said one or more degraded in situ gelable polymers, and c. after gel formation, effecting one or more polymer floods and/or waterfloods, wherein the oil recovery effected by said one or more polymer floods and/or one or more waterfloods is increased as a result of the gels formed by said one or more degraded in situ gelable polymers as compared to a method which did not comprise use of said one or more degraded in situ gelable polymers. The present disclosure generally relates to a method of enhanced oil recovery, comprising: a. performing one or more polymer floods and/or water floods; b. introducing one or more degraded in situ gelable polymers into a desired location; c. gelation of said one or more degraded in situ gelable polymers, and d. after gel formation, effecting one or more polymer floods and/or waterfloods, wherein the oil recovery effected by said one or more polymer floods and/or one or more waterfloods is increased as a result of the gels formed by said one or more degraded in situ gelable polymers as compared to a method which did not comprise use of said one or more degraded in situ gelable polymers. Moreover, the present disclosure generally relates to a method of enhanced oil recovery, comprising: (i) providing a formulation comprising one or more degraded in situ gelable polymers or a composition containing as discussed herein, and (ii) delivering the formulation into the oil source, whereby the formulation enhances oil recovery from the oil source. The present disclosure also generally relates to method of enhanced oil recovery, comprising: (i) obtaining or providing a composition comprising one or more degraded in situ gelable polymers; (ii) placing the composition in a subterranean formation downhole; (iii) allowing sufficient time for the one or more degraded in situ gelable polymers to set or gel and (iv) extracting material comprising petroleum from the subterranean formation downhole via a production wellbore. Furthermore, the present disclosure generally pertains to A method for remediation of a zone within a subterranean formation bearing heavy/viscous oil to inhibit breakthrough of water from a water injection well via the zone into a production well, the zone comprised of a void space, a halo region, or both, within the zone due to production of the heavy/viscous oil through the production well, the zone thereby allowing for pressure communication between the injection well and the production well, comprising: (i) injecting a composition into the zone via the injection well, the composition comprising one or more degraded in situ gelable polymers or a composition as described herein; (ii) allowing the one or more degraded in situ gelable polymers to set or gel for a time sufficient to form a plug which reduces flow communication of water between the injection well and the production well.

The present disclosure also generally relates to a composition suitable for use in enhanced oil recovery, wherein said composition comprises one or more degraded in situ gelable polymers and an aqueous fluid. In some embodiments, said composition may be suitable for use as a conformance control agent. In some embodiments, said composition may be suitable for use as a mobility control agent. In some embodiments, at least one of said one or more degraded in situ gelable polymers may comprise one or more anionic monomers. In some embodiments, at least one of said one or more degraded in situ gelable polymers may comprise any one or more of the following anionic monomers: acrylic acid, beta-carboxyethyl acrylate, sodium 1-allyloxy-2-hydroxy propane sulphonate, 3-Allyloxy-2-hydroxypropane sulfonate sodium salt, vinylsulfonic acid sodium salt. acrylamide tertiary butyl sulfonic acid (also known as 2-acrylamido-2-methylpropane sulfonic acid or N-t-butyl acrylamide sulfonic acid) ("ATBS"); vinylsulfonic acid; 4-styrenesulfonic acid. In some embodiments, at least one of said one or more degraded in situ gelable polymers may comprise one or more acrylic acid monomers. In some embodiments, at least one of said one or more degraded in situ gelable polymers may comprise from about 15 mol percent to about 30 mol percent of one or more anionic monomers. In some embodiments, at least one of said one or more degraded in situ gelable polymers may comprise one or more glyoxal groups, wherein the glyoxal groups may be introduced through any known glyoxalation reaction and/or comprises any known glyoxal sequence. In some embodiments, said composition comprising one or more degraded in situ gelable polymers may be prepared by (i) providing one or more polyacrylamide-based polymers, wherein said polymers optionally comprises one or more acrylamide monomers and one or more acrylic acid monomers; (ii) contacting an aqueous solution or aqueous composition, such as a brine, with said one or more polymers; (iii) contacting said aqueous solution or composition with one or more degradation agents, which degrade said one or more polymers into one or more polymers comprising reduced molecular weight fragments; (iv) contacting said aqueous solution or composition with one or more crosslinkers comprising a glyoxal and/or a glyoxalating agent; and (v) optionally adjusting the pH of said solution or composition to a desired value by adding one or more buffers, such as an alkaline buffer. In some embodiments, at least one of said one or more degraded in situ gelable polymers may comprise 5 wt % or less, 10 wt % or less, 15 wt % or less, 20 wt % or less, 25 wt % or less, 30 wt % or less, 35 wt % or less, 40 wt % or less, 45 wt % or less, 50 wt % or less, 55 wt % or less, 60 wt % or less, 65 wt % or less, 70 wt % or less, 75 wt % or less, 80 wt % or less, or 80 wt % or more of glyoxal and/or glyoxalating agent. In some embodiments, the molecular weight of said one or more degraded in situ gelable polymers may be between about 1 million and about 6 million Da. In some embodiments, said composition may comprise 0.5% active degraded in situ gelable polymer. In some embodiments, the viscosity of said composition which comprises one or more degraded in situ gelable polymers may be about 5 cPs or less, about 6 cPs or less, about 7 cPs or less, about 8 cPs or less, about 9 cPs or less, about 10 cPs or less about 12.5 cPs or less, about 15 cPs or less, about 20 cPs or less, about 25 cPs or less, about 30 cPs or less, about 35 cPs or less, about 40 cPs or less, about 45 cPs or less, about 50 cPs or less, about 55 cPs or less, about 60 cPs or less, about 65 cPs or less, about 70 cPs or less, about 75 cPs or less, about 80 cPs or less, about 85 cPs or less, about 90 cPs or less, about 95 cPs or less, about 100 cPs or less, or more than about 100 cPs prior to introduction of said composition to a desired location. In some embodiments, said composition may form a gel once in a desired location after a desired period of time. In some embodiments, said desired location may be an anaerobic environment. In some embodiments, the viscosity of said composition which comprises one or more degraded in situ gelable polymers may be about $10^2$ cPs or less, about $10^2$ cPs or more, about $10^3$ cPs or more, about $10^4$ cPs or more, or about $10^5$ cPs or more, a desired amount of time following introduction of said solution or composition into a desired location. In some embodiments, said composition may form a gel once in a desired location and said gel formation may occur after 5 days or less, 5 days or more, 6 days or more, 7 days or more, 8 days or more, 9 days or more, 10 days or more, 11 days or more, 12 days or more, 13 days or more, 14 days or more, 3 weeks or less, 3 weeks or more, 4 weeks or more, 5 weeks or more, 6 weeks or more, 7 weeks or more, or 8 weeks or more following introduction into said desired location. In some embodiments, said composition forms a gel once in a desired location and said gel may be stable for 1 month or less, 1 month or more, 2 months or more, 3 months or more, 4 months or more, 5 months or more, or 6 months or more following its formation in said desired location. In some embodiments, the pH of a composition comprising one or more degraded in situ gelable polymers may influence the solution-gelation transition. In some embodiments, compositions comprising a higher degree of alkalinity as compared to other compositions comprising one or more degraded in situ gelable polymers may result in a shorter period, the same time period, or a longer time period in which a gel forms. In some embodiments, said composition may be substantially free of oxygen. In some embodiments, wherein said composition may be sparged, e.g., sparged with nitrogen. In some embodiments, said composition may comprise one or more oxygen scavengers, e.g., said one or more oxygen scavengers comprise one or more compounds comprising sulfite and/or bisulfate.

DETAILED DESCRIPTION

Definitions

Figure 1:
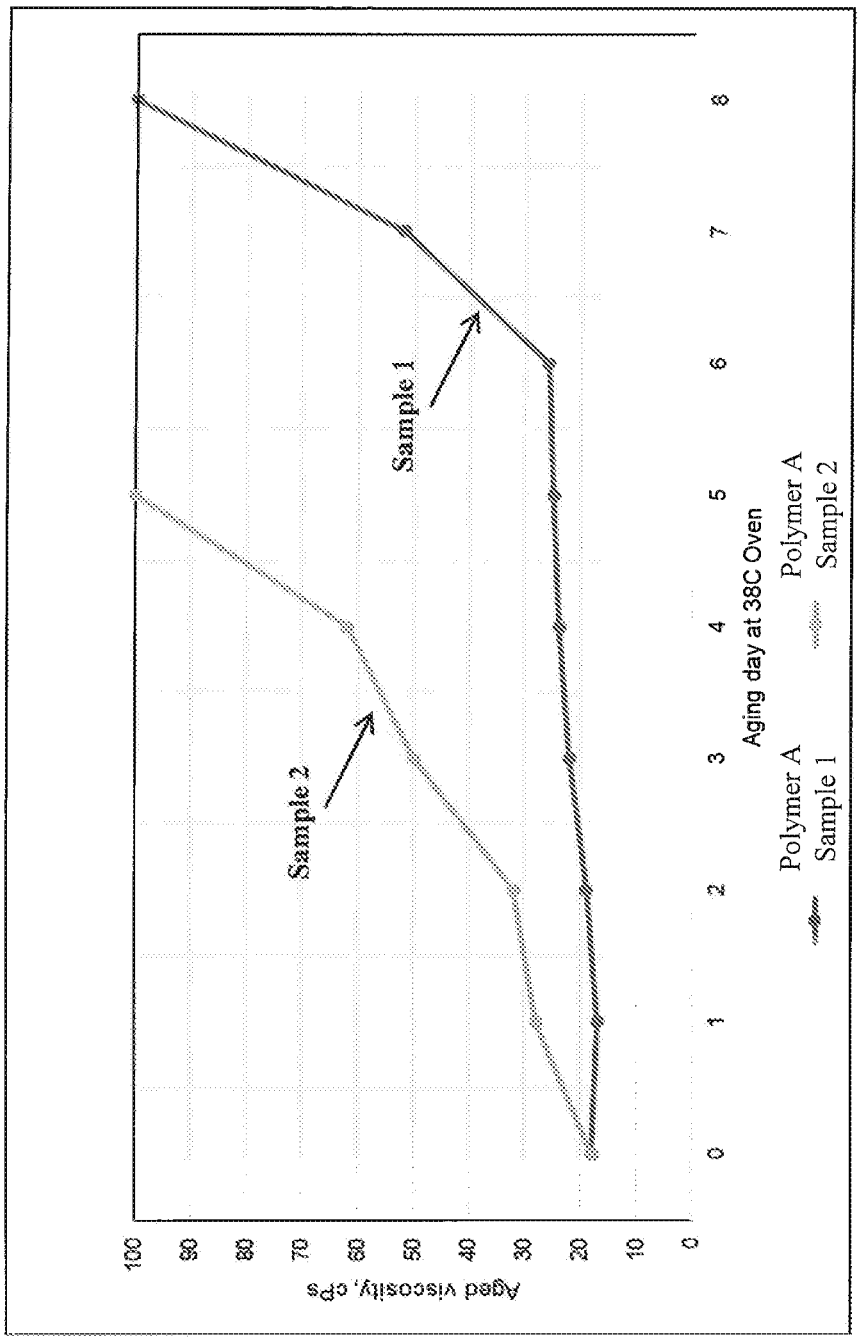
FIG. 1 illustrates viscosity measurements that were taken during an aging experiment performed in accordance with Example 2.

As used herein the singular forms "a", "and", and "the" include plural referents unless the context clearly dictates otherwise. All technical and scientific terms used herein have the same meaning as commonly understood to one of ordinary skill in the art to which this invention belongs unless clearly indicated otherwise.

As used herein, the term "enhanced oil recovery" or "EOR" (sometimes also known as improved oil recovery ("IOR") or tertiary mineral oil production) generally refers to techniques for increasing the amount of unrefined petroleum (for example, crude oil) that may be extracted from an oil reservoir, such as an oil field. Examples of EOR techniques include, for example, miscible gas injection (e.g., carbon dioxide flooding), chemical injection, which is sometimes referred to as chemical enhanced oil recovery ("CEOR"), and which includes, for example, polymer flooding, alkaline flooding, surfactant flooding, micellar polymer flooding, conformance control operations, as well as combinations thereof such as alkaline-polymer flooding or alkaline-surfactant-polymer flooding, microbial injection, and thermal recovery (e.g., cyclic steam, steam flooding, or fire flooding). In some embodiments, the EOR operation may include a polymer ("P") flooding operation, an alkaline-polymer ("AP") flooding operation, a surfactant-polymer ("SP") flooding operation, an alkaline-surfactant-polymer ("ASP") flooding operation, a conformance control operation, or any combination thereof.

As used herein, the terms "polymer flood" or "polymer flooding" generally refer to a chemical enhanced EOR technique that typically involves injecting an aqueous fluid that is viscosified with one or more water-soluble polymers through injection boreholes into an oil reservoir to mobilize oil left behind after primary and/or secondary recovery. As a general result of the injection of one or more polymers, the oil may be forced in the direction of the production borehole, and the oil may be produced through the production borehole. Details of examples of polymer flooding and of polymers suitable for this purpose are disclosed, for example, in "Petroleum, Enhanced Oil Recovery, Kirk-Othmer, Encyclopedia of Chemical Technology, online edition, John Wiley & Sons, 2010". One or more surfactants may be injected (or formed in situ) as part of the EOR technique. Surfactants may function to reduce the interfacial tension between the oil and water, which may reduce capillary pressure and improve mobilization of oil. Surfactants may be injected with polymers (e.g., a surfactant-polymer (SP) flood), or formed in-situ (e.g., an alkaline-polymer (AP) flood), or a combination thereof (e.g., an alkaline-surfactant-polymer (ASP) flood). As used herein, the terms "polymer flood" and "polymer flooding" encompass all of these EOR techniques.

As used herein, the term "monomer" generally refers to nonionic monomers, anionic monomers, cationic monomers, zwitterionic monomers, betaine monomers, and amphoteric ion pair monomers.

As used herein, the terms "polymer," "polymers," "polymeric," and similar terms are used in their ordinary sense as understood by one skilled in the art, and thus may be used herein to refer to or describe a large molecule (or group of such molecules) that may comprise recurring units. Polymers may be formed in various ways, including by polymerizing monomers and/or by chemically modifying one or more recurring units of a precursor polymer. Unless otherwise specified, a polymer may comprise a "homopolymer" that may comprise substantially identical recurring units that may be formed by various methods e.g., by polymerizing a particular monomer. Unless otherwise specified, a polymer may also comprise a "copolymer" that may comprise two or more different recurring units that may be formed by, e.g., copolymerizing, two or more different monomers, and/or by chemically modifying one or more recurring units of a precursor polymer. Unless otherwise specified, a polymer or copolymer may also comprise a "terpolymer" that may comprise polymers that may comprise three or more different recurring units. The term "polymer" as used herein is intended to include both the acid form of the polymer as well as its various salts. Polymers may be amphoteric in nature, i.e., containing both anionic and cationic substituents, although not necessarily in the same proportions.

As used herein the term "nonionic monomer" generally refers to a monomer that possesses a neutral charge. Nonionic monomers may comprise but are not limited to comprising monomers selected from the group consisting of acrylamide ("AMD"), acrylic, methacrylic, methacrylamido, vinyl, allyl, ethyl, and the like, all of which may be substituted with a side chain selected from, for example, an alkyl, arylalkyl, dialkyl, ethoxyl, and/or hydrophobic group. In some embodiments, a nonionic monomer may comprise AMD. In some embodiments, nonionic monomers may comprise but are not limited to comprising vinyl amide (e.g., acrylamide, methacrylamide, N-methylacrylamide, N,N-dimethylacrylamide), acryloylmorpholine, acrylate, maleic anhydride, N-vinylpyrrolidone, vinyl acetate, N-vinyl formamide and their derivatives, such as hydroxyethyl (methyl) acrylate $CH_2=CR-COO-CH_2CH_2OH$ (I) and $CH_2=CR-CO-N(Z1)(Z2)$ (2) N-substituted (methyl) acrylamide (II). R=H or Me; Z1=5-15C alkyl; 1-3C alkyl substituted by 1-3 phenyl, phenyl or 6-12C cycloalkyl (both optionally substituted) and Z2=11; or Z1 and Z2 are each 3-10C alkyl; (II) is N-tert. hexyl, tert. octyl, methylundecyl, cyclohexyl, benzyl, diphenylmethyl or triphenyl acrylamide. Nonionic monomers further may include dimethylaminoethylacrylate ("DMAEMA"), dimethylaminoethyl methacrylate ("DMAEM"), N-isopropylacrylamide and N-vinyl formamide. Nonionic monomers can be combined, for example to form a terpolymer of acrylamide, N-vinyl formamide, and acrylic acid.

As used herein, the term "anionic monomers" includes anionic monomers that are substantially anionic in whole or (in equilibrium) in part, at a pH in the range of about 4.0 to about 9.0. The "anionic monomers" may be neutral at low pH (from a pH of about 2 to about 6), or to anionic monomers that are anionic at low pH.

Examples of anionic monomers which may be used herein which further may be substituted with other groups include but are not limited to those comprising acrylamide ("AMD"), acrylic, methacrylic, methacrylamido, vinyl, allyl, ethyl, and the like; maleic monomers and the like; calcium diacrylate; and/or any monomer substituted with a carboxylic acid group or salt thereof. In some embodiments, these anionic monomers may be substituted with a carboxylic acid group, and include, for example, acrylic acid, and methacrylic acid. In some embodiments, an anionic monomer which may be used herein may be a (meth)acrylamide monomer wherein the amide group has been hydrolyzed to a carboxyl group. Said monomer may be a derivative or salt of a monomer according to the embodiments. Additional examples of anionic monomers comprise but are not limited to those comprising sulfonic acids or a sulfonic acid group, or both. In some embodiments, the anionic monomers which may be used herein may comprise a sulfonic function that may comprise, for example, acrylamide tertiary butyl sulfonic acid (also known as 2-acrylamido-2-methylpropane sulfonic acid or N-t-butyl acrylamide sulfonic acid) ("ATBS"); vinylsulfonic acid; 4-styrenesulfonic acid; and/or any salts of any of these moieties/monomers. In some embodiments, anionic monomers may comprise organic acids. In some embodiments, anionic monomers may comprise acrylic acid, methacrylic acid, maleic acid, itaconic acid, acrylamido methylpropane sulfonic acid, vinylphosphonic acid, styrene sulfonic acid and their salts such as sodium, ammonium and potassium. Anionic monomers can be combined, for example, to form a terpolymer of acrylamide, acrylic acid and 2-acrylamido-2-methylpropane sulfonic acid. In some embodiments, an anionic monomer may comprise any one or more of the following: beta-carboxyethyl acrylate, Sodium 1-allyloxy-2-hydroxy propane sulphonate, 3-Allyloxy-2-hydroxypropane sulfonate sodium salt, vinylsulfonic acid sodium salt. acrylamide tertiary butyl sulfonic acid (also known as 2-acrylamido-2-methylpropane sulfonic acid or N-t-butyl acrylamide sulfonic acid) ("ATBS"); vinylsulfonic acid; 4-styrenesulfonic acid.

As used herein, the term "cationic monomer" generally refers to a monomer that possesses a positive charge. Examples of cationic monomers may comprise but are not limited to those comprising acryloyloxy ethyl trimethyl ammonium chloride ("AETAC"), methacryloyloxyethyltrimethylammonium chloride, methacrylamidopropyltrimethylammonium chloride ("MAPTAC"), acrylamidopropyltrimethylammonium chloride, methacryloyloxyethyldimethylammonium sulfate, dimethylaminoethyl acrylate, dimethylaminopropylmethacrylamide, Q6, Q6o 4, and/or diallyldimethylammonium chloride ("DADMAC").

Said cationic monomers may also comprise but are not limited to comprising dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MCQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride. Alkyl groups may generally but are not limited to those comprising $C_{1-8}$ alkyl groups. In some embodiments, cationic monomers may comprise quaternary ammonium or acid salts of vinyl amide, vinyl carboxylic acid, methacrylate and their derivatives. Cationic monomers may comprise but are not limited to comprising monomers selected from the group consisting of dimethylaminoethylacrylate methyl chloride quaternary salt, dimethylaminoethylmethacrylate methyl chloride quaternary salt, and diallyldimethyl ammonium chloride. Cationic monomers can be combined, for example, to form a terpolymer of dimethylaminoethylmethacrylate methyl chloride quaternary salt, and diallyldimethyl ammonium chloride and acrylamide.

The term "water-soluble polymer" generally refers to any polymer that may dissolve, disperse, or swell in water. Said polymers may modify the physical properties of aqueous systems undergoing gelation, thickening, viscosification, or emulsification/stabilization. Said polymers may perform a variety of functions, including but not limited to use as dispersing and suspending agents, stabilizers, thickeners, viscosifiers, gelants, flocculants and coagulants, film-formers, humectants, binders, and lubricants.

In the context of polymer flooding, a water-soluble polymer may include, but not be limited to including, one or more acrylamide-based polymers and/or copolymers of acrylamide and further monomers, for example, vinylsulfonic acid or acrylic acid. Polyacrylamide may be partly hydrolyzed polyacrylamide ("HPAM"), in which some of the acrylamide units have been hydrolyzed to acrylic acid. In some instances, a water soluble polymer may comprise a sulfonated polyacrylamide. In some embodiments, one or more acrylamide (co)polymers may be a polymer useful for enhanced oil recovery (EOR) applications.

As used herein, the terms "polyacrylamide" or "PAM" generally refer to polymers and co-polymers comprising acrylamide moieties, and the terms encompass any polymers or copolymers comprising acrylamide moieties, e.g., one or more acrylamide (co)polymers. Furthermore, PAMs may comprise any of the polymers or copolymers discussed herein. In some embodiments, PAMS may comprise sulfonated PAM, such as, for example, copolymers of acrylamide and acrylamide tertiary butyl sulfonic acid (also known as 2-acrylamido-2-methylpropane sulfonic acid or N-t-butyl acrylamide sulfonic acid) ("ATBS"); vinylsulfonic acid; 4-styrenesulfonic acid; and/or any salts of any of these moieties/monomers. Additionally, the PAMs described herein, e.g., one or more acrylamide (co)polymers, may be provided in one of various folios, including, for example, dry (powder) form (e.g., DPAM), water-in-oil emulsion (inverse emulsion), suspension, dispersion, or partly hydrolyzed (e.g., HPAM, in which some of the acrylamide units have been hydrolyzed to acrylic acid). In some embodiments, PAMs, e.g., one or more acrylamide (co)polymers, may be used for polymer flooding. In some embodiments, PAMS, e.g., one or more acrylamide (co)polymers, may be used in any EOR technique.

As used herein, the terms "sulfonated polyacrylamide" or "sulfonated PAM" generally refer to polyacrylamide polymers or PAMs as above-defined which comprise one or more sulfonic acid moieties, e.g., one or more sulfonic acid monomers. Examples thereof include acrylamide tertiary butyl sulfonic acid (also known as 2-acrylamido-2-methylpropane sulfonic acid or N-t-butyl acrylamide sulfonic acid) ("ATBS"); vinylsulfonic acid; 4-styrenesulfonic acid; and any salts of any of these moieties/monomers.

As used herein, the term "thief zone" generally refers to zones within a reservoir into which injected water may preferentially enter over a comparably lower permeability zone, and said preferential entry may result in the injected water not reaching unswept zones. As such, a thief zone may be a pore, channel, and/or void into which water and/or other injected materials may enter in an undesirable manner. In some embodiments, one or more in situ gelable polymers or a composition or solution comprising may enter thief zones, subsequently form a gel and thereby block the undesired entry of water and/or other injected materials during enhanced oil recovery.

As used herein, the term "conformance control" generally refers to any process by which the sweeping of a reservoir may be spread more evenly.

As used herein, the term "conformance control agent" generally refers to any material, technique, method, and/or process that may be used to effect conformance control.

As used herein, the term "sweep efficiency" generally refers to a measure of the effectiveness of an enhanced oil recovery process that may depend on the volume of the reservoir contacted by the injected fluid.

As used herein, the term "mobility control" generally refers to a condition in oil recovery processes, e.g., enhanced oil recovery processes, whereby the mobility of the injectant is lower than that of the oil or preceding chemical slug, leading to a stable displacement by the injectant. In some instances, the injectant is water containing a soluble polymer that increases its viscosity, such as, for example, may occur during a polymer flood.

As used herein, the term "mobility control agent" generally refers to any material, technique, method, composition, and/or process that may be used to effect mobility control.

As used herein, the term "fracturing" generally refers to processes and methods of breaking down a geological formation and creating a fracture, i.e. the rock formation around a well bore, by pumping fluid at very high pressures (pressure above the determined closure pressure of the formation), in order to increase production rates from or injection rates into a hydrocarbon reservoir. The fracturing methods otherwise use conventional techniques known in the art.

As used herein, the term "degradation agent" generally refers to an element or compound that may be used to effect a reduction of the molecular weight of a polymer, e.g., a PAM, such as, for example, by breaking bonds comprised by a polymer. In some embodiments, a degradation agent may comprise iron II sulfate. In some embodiments, a degradation agent may comprise any one or more of the following: iron II sulfate, persulfates, peroxides, sodium chlorite, tin (II) chloride, percarbonates, a ferrous compound, a ferrous salt, a ferric compound, a ferric salt, a ferrous salt having an organic anion, a ferrous salt having an inorganic anion, ferrous chloride, ferrous bromide, ferrous fluoride, ferrous sulfate, ammonium iron sulfate, a ferric salt having an organic anion, a ferric salt having an inorganic anion, ferric citrate, ferric chloride, ferric bromide, ferric fluoride, ferric sulfate, ammonium sulfate, ammonium persulfate, enzymes, copper compounds, ethylene glycol, glycol ethers, and combinations or mixtures thereof. In some embodiments, a degradation agent may comprise one or more compounds comprising iron II.

As used herein, the terms "in situ gelable polymer", "polymers capable of in situ gelation", and the like, generally refer to polymers that may form gels and/or gel-like structures when said polymers are present within a desired location and/or a desired formation, such as, for example, once inside an oil reservoir, and/or once inside a formation that is subject to enhanced oil recovery. In some embodiments, an in situ gelable polymer may comprise one or more acrylamide monomers. In some embodiments, an in situ gelable polymer may comprise one or more anionic monomers. In some embodiments, an in situ gelable polymer may comprise one or more acrylamide monomers and one or more anionic monomers. In some embodiments, an in situ gelable polymer may comprise one or more acrylamide monomers and one or more acrylic acid monomers. In some embodiments, an in situ gelable polymer may comprise one or more anionic monomers, including but not limited to: acrylic acid, beta-carboxyethyl acrylate, Sodium 1-allyloxy-2-hydroxy propane sulphonate, 3-Allyloxy-2-hydroxypropane sulfonate sodium salt, vinylsulfonic acid sodium salt. acrylamide tertiary butyl sulfonic acid (also known as 2-acrylamido-2-methylpropane sulfonic acid or N-t-butyl acrylamide sulfonic acid) ("ATBS"); vinylsulfonic acid; 4-styrenesulfonic acid. In some embodiments, an in situ gelable polymer may comprise from about 5 mol percent to about 40 mol percent of one or more anionic monomers, e.g., one or more acrylic acid monomers. In some embodiments, an in situ gelable polymer may comprise from about 60% to about 95% of one or more acrylamide monomers. In some embodiments, an in situ gelable polymer may comprise a terpolymer, for example, a terpolymer comprising one or more acrylamide monomers, one or more acrylic acid monomers, and one or more anionic monomers, e.g., ATBS. Said one or more anionic monomers may be about 1 mol % to about 10 mol % of said terpolymer, and, in some instances, may replace acrylamide that would otherwise be present if said terpolymer was a copolymer. In some embodiments, an in situ gelable polymer may comprise about 70 mol % acrylamide and about 30% acrylic acid. In some embodiments, an in situ gelable polymer may comprise about 90 mol % acrylamide and about 10% acrylic acid. In some embodiments, an in situ gelable polymer may comprise one or more dialdehyde groups. Said dialdehyde groups may include, for example, any one or more of the following: glyoxal, malondialdehyde, succindialdehyde, glutaraldehyde, adipaldehyde, o-phthaldehyde, m-phthaldehyde, p-phthaldehyde, any suitable dialdehyde compound, and mixtures thereof. In some embodiments, an in situ gelable polymer may comprise one or more glyoxal groups, wherein the glyoxal groups may be introduced through any known glyoxalation reaction or and/or may comprise any known glyoxal sequence. In some embodiments, an in situ gelable polymer may comprise about 70 mol % acrylamide and about 30% acrylic acid and further comprise dialdehyde groups, optionally wherein said dialdehyde groups are post-added. In some embodiments, an in situ gelable polymer may be glyoxalated. In some embodiments, a degraded in situ gelable polymer may be prepared by (i) providing one or more polyacrylamide-based polymers, wherein said polymers optionally comprises one or more acrylamide monomers and one or more acrylic acid monomers; (ii) contacting an aqueous solution or aqueous composition, such as a brine, with said one or more polymers; (iii) contacting said aqueous solution or composition with one or more degradation agents, which degrade said one or more polymers into one or more polymers comprising reduced molecular weight fragments; (iv) contacting said aqueous solution or composition with one or more crosslinkers comprising a dialdehyde; (v) optionally adjusting the pH of said solution or composition to a desired value by adding one or more buffers, such as an alkaline buffer. In some embodiments, a degraded in situ gelable polymer may be prepared by (i) providing one or more polyacrylamide-based polymers, wherein said polymers optionally comprises one or more acrylamide monomers and one or more acrylic acid monomers; (ii) contacting an aqueous solution or aqueous composition, such as a brine, with said one or more polymers; (iii) contacting said aqueous solution or composition with one or more degradation agents, which degrade said one or more polymers into one or more polymers comprising reduced molecular weight fragments; (iv) contacting said aqueous solution or composition with glyoxal and/or a glyoxalating agent; (v) optionally adjusting the pH of said solution or composition to a desired value by adding one or more buffers, such as an alkaline buffer. In some embodiments, the polyacrylamide-based polymer of step (i) may be a DPAM and/or an HPAM. In some embodiments, step (iv) occurs before, during, and/or after step (iii). In some embodiments, step (iii) occurs before step (iv), and optionally wherein a an incubation period occurs after step (iii) and before step (iv), e.g., an hour or less or an hour or more incubation period. In some embodiments, step (iv) occurs before step (iii). In some embodiments, step (iv) occurs during step (iii). In some embodiments, step (iv) occurs after step (iii). In some embodiments, step (v) occurs after steps (i)-(iv). In some embodiments, step (iv) occurs before and during step (iii). In some embodiments, step (iv) occurs during and after step (iii). In some embodiments step (iv) occurs before, during, and after step (iii). In some embodiments, step (iv) comprises adding 5 wt % or less, 10 wt % or less, 15 wt % or less, 20 wt % or less, 25 wt % or less, 30 wt % or less, 35 wt % or less, 40 wt % or less, 45 wt % or less, 50 wt % or less, 55 wt % or less, 60 wt % or less, 65 wt % or less, 70 wt % or less, 75 wt % or less, 80 wt % or less, or 80 wt % or more of said one or more crosslinkers to said aqueous solution or aqueous composition. In some embodiments, step (iv) comprises adding 5 wt % or less, 10 wt % or less, 15 wt % or less, 20 wt % or less, 25 wt % or less, 30 wt % or less, 35 wt % or less, 40 wt % or less, 45 wt % or less, 50 wt % or less, 55 wt % or less, 60 wt % or less, 65 wt % or less, 70 wt % or less, 75 wt % or less, 80 wt % or less, or 80 wt % or more of one or more glyoxal groups to said aqueous solution or aqueous composition. In some instances, the wt % may be a dry weight percentage. In some embodiments, the polyacrylamide-based polymer of step (i) may be a DPAM and/or an HPAM. In some embodiments, at least one of said one or more polyacrylamide-based polymers of step (i) has a molecular weight of about 10 million Da or less, about 11 million Da or less, about 12 million Da or less, about 13 million Da or less, about 14 million Da or less, about 15 million Da or less, or about 15 million Da or more. In some embodiments, step (iii) results in at least one of said one or more polymers having a molecular weight of about 1 million Da or less, about 2 million Da or less, about 3 million Da or less, about 4 million Da or less, about 5 million Da or less, about 6 million Da or less, or about 6 million Da or more. In some embodiments, steps (i)-(v) occur onsite, i.e., at a location where said one or more degraded, in situ gelable polymers are intended for use. In some embodiments, the amount of degradation agent added may be an amount that results in a polymer having a molecular weight between about 1 million and about 4 million Da. In some embodiments, the amount of degradation agent added may about 50 ppm or less, about 75 ppm or less, about 80 ppm or less, about 100 ppm or less, about 125 ppm or less, about 150 ppm or less, about 175 ppm or less, about 200 ppm or less, about 250 ppm or less, about 300 ppm or less, about 350 ppm or less, about 400 ppm or less, about 450 ppm or less, about 500 ppm or less, or about 500 ppm or more. In some embodiments, the aqueous solution or composition may be sparged, e.g., sparged with nitrogen. In some embodiments, the aqueous solution or composition may be substantially free of oxygen. In some embodiments, the aqueous solution or composition may comprise one or more oxygen scavengers, e.g., one or more compounds comprising sulfite and/or bisulfate. In some embodiments, the viscosity of an aqueous solution or aqueous composition which comprises one or more degraded in situ gelable polymer may have a viscosity similar to that of water prior to introduction of said solution or composition into a desired location, e.g., a structure and/or formation, e.g., being introduced to a formation downhole, and, after said introduction, the aqueous solution or composition comprising said one or more degraded in situ gelable polymers begins to increase in viscosity. In some embodiments, after a solution or composition comprising one or more degraded in situ gelable polymers is introduced into a desired location, e.g., a formation and/or structure and/or reservoir, such as by pumping said solution or composition downhole, the one or more degraded in situ gelable polymers may form a gel. In some embodiments, the gel formation may be a result of the conditions downhole, such as, for example, an increased temperature downhole as compared to the temperature on the surface at which said solution or composition comprising said one or more polymers was prepared for injection. In some embodiments, said gel formation may occur after a desired amount of time. In some embodiments, said gel formation may occur after 5 days or less, 5 days or more, 6 days or more, 7 days or more, 8 days or more, 9 days or more, 10 days or more, 11 days or more, 12 days or more, 13 days or more, 14 days or more, or 15 days or more. In some embodiments, the temperature on the surface, i.e., wherein said degraded in situ gelable polymers are prepared, optionally by the steps recited above, is about 25° C. In some embodiments, the temperature of the reservoir and/or structure and/or formation into which one or more degraded in situ gelable polymers may be introduced may be about 30° C. or less, 30° C. or more, 40° C. or more, 50° C. or more, 60° C. or more, 70° C. or more, 80° C. or more, 90° C. or more, 100° C. or more, 110° C. or more, or about 120° C. or more. In some embodiments, an increase in temperature, such as relative to the temperature above ground, may effect gelation of said one or more degraded in situ getable polymers. In some embodiments, an aqueous solution or composition comprising one or more degraded in situ gelable polymers may not form a gel prior to introduction into a desired location, i.e., said solution or composition may not form a gel when at normal/standard above-ground conditions. In some embodiments, some gelation of the degraded in situ gelable polymer containing solution or composition may occur prior to its introduction into a desired location where in situ gelation is desired. In some embodiments, a solution or composition comprising one or more degraded in situ gelable polymers may be about an 0.5% active solution or composition. In some embodiments, the pH of a solution or composition comprising one or more degraded in situ gelable polymers may influence the solution-gelation transition. In some embodiments, the pH of a solution or composition comprising one or more degraded in situ gelable polymers may be from about 6.5 to about 8.5, e.g., in some instances the solution or composition comprising the one or more degraded in situ gelable polymers may comprise a pH of about 7.8 or may comprise a pH of about 8.2. In some embodiments, the more alkaline and/or basic the pH of a solution or composition comprising degraded one or more in situ gelable polymers, the shorter the duration of time for an increase in viscosity and/or gel formation to occur in said solution and/or composition. In some embodiments, the more alkaline and/or basic the pH of a solution or composition comprising degraded one or more in situ gelable polymers, the longer the duration of time for an increase in viscosity and/or gel formation to occur in said solution and/or composition. In some embodiments, one or more degraded in situ gelable polymers may form a gel once in a desired location, such as for example, once in a desired structure and/or formation and/or location downhole, and, once said gel is formed, said gel may be stable for 1 month or less, 1 month or more, 2 months or more, 3 months or more, 4 months or more, 5 months or more, or 6 months or more. In some embodiments, one or more degraded in situ gelable polymers may form a gel once in a desired location, such as for example, once in a desired structure and/or formation and/or location downhole, and, once said gel is formed, said gel may be stable for the lifetime of the structure and/formation and/or location. In some embodiments, one or more degraded in situ gelable polymers may be used as conformation control agents. In some embodiments, one or more degraded in situ gelable polymers may be used as mobility control agents. In some embodiments, an aqueous composition or aqueous solution comprising one or more degraded in situ gelable polymers may be able to enter formations of 10 darcies or more, 10 darcies or less, 5 darcies or less, 1 darcy or less, or about 0.5 darcies or less. In some embodiments, one or more degraded in situ gelable polymers may be glyoxalated, and the glyoxal groups may participate in crosslinks that may thereby promote gel formation once said one or more in situ gelable polymers are present in a desired location. In some embodiments, any one of the molecular weight of one or more in situ gelable polymers or degraded in situ gelable polymers, the polymeric formulation of said one or more in situ gelable or degraded in situ gelable polymers, the crosslinker dosage, e.g., dialdehyde dosage, and/or the solution alkalinity levels, may influence the solution gelation transition of one or more degraded in situ gelable polymers. In some embodiments, after gelation the resultant gelation viscosity or gel strength of a gel formed by a degraded in situ gelable polymer may approximate that of a non-degraded glyoxalated polyacrylamide ("GPAM") gel.

As used herein, the terms "desired location" and "target location" and the like generally refer to any formation and/or structure into which the introduction of one or more degraded in situ gelable polymers may increase oil recovery from said formation or structure. In some embodiments, a desired location may be a location downhole. In some embodiments, a desired location may be an oil reservoir, and/or any structure or formation within said oil reservoir. In some embodiments, a desired location may be a location in which enhanced oil recovery is to be performed. In some embodiments, a desired location may be a natural fracture or a vug. In some embodiments, a desired location may be a high permeability zone. In some embodiments, a desired location may be a low permeability zone. In some embodiments, a desired location may be a formation of 10 darcies or more, 10 darcies or less, 5 darcies or less, 1 darcy or less, or about 0.5 darcies or less. In some embodiments, a desired location may be substantially free from oxygen. In some embodiments, a desired location may be an anaerobic environment.

Methods and Compostions

Disclosed herein are methods and compositions for enhanced oil recovery, such as chemical enhanced oil recovery and/or enhanced oil recovery which comprises polymer flooding and/or enhanced oil recovery which comprises conformance control and/or mobility control, wherein said methods comprise use of one or more degraded in situ gelable polymers and compositions comprise one or more degraded in situ gelable polymers. Moreover, the present disclosure generally relates to a method of enhanced oil recovery which method comprises introducing one or more degraded in situ gelable polymers into a desired location, e.g., a desired formation downhole, which one or more degraded in situ gelable polymers when introduced into said desired location when present for a desired duration form a gel in said desired location. In some embodiments, at least one of said one or more degraded in situ gelable polymers may comprise one or more acrylamide monomers. In some embodiments, at least one of said one or more degraded in situ gelable polymers may comprise one or more anionic monomers. In some embodiments, at least one of said one or more degraded in situ gelable polymers may comprise one or more acrylamide monomers and one or more anionic monomers. In some embodiments, at least one of said one or more degraded in situ gelable polymers may comprise one or more acrylamide monomers and one or more acrylic acid monomers. In some embodiments, at least one of said one or more degraded in situ gelable polymers may comprise one or more anionic monomers, including but not limited to: acrylic acid, beta-carboxyethyl acrylate, sodium 1-allyloxy-2-hydroxy propane sulphonate, 3-Allyloxy-2-hydroxypropane sulfonate sodium salt, vinylsulfonic acid sodium salt. acrylamide tertiary butyl sulfonic acid (also known as 2-acrylamido-2-methylpropane sulfonic acid or N-t-butyl acrylamide sulfonic acid) ("ATBS"); vinylsulfonic acid; 4-styrenesulfonic acid. In some embodiments, at least one of said one or more degraded in situ gelable polymers may comprise from about 5 mol percent to about 40 mol percent of one or more anionic monomers, e.g., one or more acrylic acid monomers. In some embodiments, at least one of said one or more degraded in situ gelable polymers may comprise at least one of said one or more degraded in situ gelable polymers may comprise a terpolymer, for example, a terpolymer comprising one or more acrylamide monomers, one or more acrylic acid monomers, and one or more anionic monomers, e.g., ATBS. Said one or more anionic monomers may be about 1 mol % to about 10 mol % of said terpolymer, and, in some instances, may replace acrylamide that would otherwise be present if said terpolymer was a copolymer. In some embodiments, at least one of said one or more degraded in situ gelable polymers may comprise about 70 mol % acrylamide and about 30% acrylic acid. In some embodiments, at least one of said one or more degraded in situ gelable polymers may comprise about 90 mol % acrylamide and about 10% acrylic acid. In some embodiments, at least one of said one or more degraded in situ gelable polymers may comprise about 70 mol % acrylamide and about 30% acrylic acid and may further comprise one or more dialdehyde groups, optionally wherein said dialdehyde groups are post-added. In some embodiments, at least one of said one or more degraded in situ gelable polymers may comprise glyoxal groups, wherein the glyoxal groups may be introduced through any known glyoxalation reaction.

In some embodiments, a method of enhanced oil recovery may a method of effecting in situ gelation of one or more degraded in situ gelable polymers at a desired location, comprising (i) providing one or more polyacrylamide-based polymers, wherein said polymers optionally comprise one or more acrylamide monomers and one or more acrylic acid monomers; (ii) contacting an aqueous solution or aqueous composition, such as a brine, with said one or more polymers; (iii) contacting said aqueous solution or composition with one or more degradation agents, which degrade said one or more polymers into one or more polymers comprising reduced molecular weight fragments; (iv) contacting said aqueous solution or composition with one or more cross-linkers comprising a dialdehyde; (v) optionally adjusting the pH of said solution or composition to a desired value by adding one or more buffers, such as an alkaline buffer; (vi) introducing or injecting the resultant degraded in situ gelable containing solution or composition into a site where in situ gelation of said one or more degraded in situ gelable polymers is to occur; and (vii) allowing for or providing conditions at the desired location which permit gelation of the one or more degraded in situ gelable polymers to occur over time. In some embodiments, a degraded in situ gelable polymer may be prepared by (i) providing one or more polyacrylamide-based polymers, wherein said polymers optionally comprises one or more acrylamide monomers and one or more acrylic acid monomers; (ii) contacting an aqueous solution or aqueous composition, such as a brine, with said one or more polymers; (iii) contacting said aqueous solution or composition with one or more degradation agents, which degrade said one or more polymers into one or more polymers comprising reduced molecular weight fragments; (iv) contacting said aqueous solution or composition with glyoxal and/or a glyoxalating agent; (v) optionally adjusting the pH of said solution or composition to a desired value by adding one or more buffers, such as an alkaline buffer; (vi) introducing or injecting the resultant degraded in situ gelable containing solution or composition into a site where in situ gelation of said one or more degraded in situ gelable polymers is to occur; and (vii) allowing for or providing conditions at the desired location which permit gelation of the one or more degraded in situ gelable polymers to occur over time. In some embodiments, the polyacrylamide-based polymer of step (i) may be a DPAM and/or an HPAM. In some embodiments, step (iv) occurs before, during, or after step (iii). In some embodiments, step (iii) occurs before step (iv), and optionally wherein an incubation period occurs after step (iii) and before step (iv), e.g., an hour or less or an hour or more incubation period. In some embodiments, step (iv) occurs before step (iii). In some embodiments, step (iv) occurs during step (iii). In some embodiments, step (iv) occurs after step (iii). In some embodiments, step (iv) occurs after steps (i)-(iv). In some embodiments, step (iv) occurs before and during step (iii). In some embodiments, step (iv) occurs during and after step (iii). In some embodiments step (iv) occurs before, during, and after step (iii). In some embodiments, step (iv) comprises adding 5 wt % or less, 10 wt % or less, 15 wt % or less, 20 wt % or less, 25 wt % or less, 30 wt % or less, 35 wt % or less, 40 wt % or less, 45 wt % or less, 50 wt % or less, 55 wt % or less, 60 wt % or less, 65 wt % or less, 70 wt % or less, 75 wt % or less, 80 wt % or less, or 80 wt % or more of said one or more crosslinkers to said aqueous solution or aqueous composition. In some embodiments, step (iv) comprises adding 5 wt % or less, 10 wt % or less, 15 wt % or less, 20 wt % or less, 25 wt % or less, 30 wt % or less, 35 wt % or less, 40 wt % or less, 45 wt % or less, 50 wt % or less, 55 wt % or less, 60 wt % or less, 65 wt % or less, 70 wt % or less, 75 wt % or less, 80 wt % or less, or 80 wt % or more of one or more glyoxal groups to said aqueous solution or aqueous composition. In some instances, the wt % may be a dry weight percentage. In some embodiments, at least one of said one or more polyacrylamide-based polymers of step (i) has a molecular weight of about 10 million Da or less, about 11 million Da or less, about 12 million Da or less, about 13 million Da or less, about 14 million Da or less, about 15 million Da or less, or about 15 million Da or more. In some embodiments, step (iii) results in at least one of said one or more polymers having a molecular weight of about 1 million Da or less, about 2 million Da or less, about 3 million Da or less, about 4 million Da or less, about 5 million Da or less, about 6 million Da or less, or about 6 million Da or more. In some embodiments, steps (i)-(v) occur onsite, i.e., at a location where said one or more degraded, in situ gelable polymers are intended for use. In some embodiments, the amount of degradation agent added may be any amount that results in one or more polymers of desired molecular weight. In some embodiments, the amount of degradation agent added may be any amount that results in a polymer having a molecular weight between about 1 million and about 4 million Da. In some embodiments, the amount of degradation agent added may about 50 ppm or less, about 75 ppm or less, about 80 ppm or less, about 100 ppm or less, about 125 ppm or less, about 150 ppm or less, about 175 ppm or less, about 200 ppm or less, about 250 ppm or less, about 300 ppm or less, about 350 ppm or less, about 400 ppm or less, about 450 ppm or less, about 500 ppm or less, or about 500 ppm or more. In some embodiments, step (v) may comprise adjusting the pH of the solution or composition to a value of about 6.5 to about 8.5.

In some embodiments, a method of enhanced oil recovery may comprise introducing one or more degraded in situ gelable polymers into a desired formation and/or structure, wherein said one or more degraded in situ gelable polymers may be comprised in an aqueous solution or composition. In some embodiments, a solution or composition comprising one or more degraded in situ gelable polymers may be about an 0.5% active solution or composition. In some embodiments, the viscosity of an aqueous solution or aqueous composition which comprises one or more degraded in situ gelable polymer may have a viscosity similar to that of water prior to introduction of said solution or composition into a desired location, such as being introduced to a formation downhole. In some embodiments, the viscosity of an aqueous solution or aqueous composition which comprises one or more degraded in situ gelable polymer may be about 5 cPs or less, about 6 cPs or less, about 7 cPs or less, about 8 cPs or less, about 9 cPs or less, about 10 cPs or less about 12.5 cPs or less, about 15 cPs or less, about 20 cPs or less, about 25 cPs or less, about 30 cPs or less, about 35 cPs or less, about 40 cPs or less, about 45 cPs or less, about 50 cPs or less, about 55 cPs or less, about 60 cPs or less, about 65 cPs or less, about 70 cPs or less, about 75 cPs or less, about 80 cPs or less, about 85 cPs or less, about 90 cPs or less, about 95 cPs or less, about 100 cPs or less, or about 100 cPs or more prior to introduction of said solution or composition into a desired location. In some embodiments, the viscosity of an aqueous solution or aqueous composition which comprises one or more degraded in situ gelable polymer may be about $10^2$ cPs or less, about $10^2$ cPs or more, about $10^3$ cPs or more, about $10^4$ cPs or more, or about $10^5$ cPs or more, a desired amount of time following introduction of said solution or composition into a desired location. In some embodiments, after a solution or composition comprising one or more degraded in situ gelable polymers is introduced into a desired location such as by pumping said solution or composition downhole, the solution or composition comprising may increase in viscosity relative to its viscosity prior to introduction. In some embodiments, after a solution or composition comprising one or more degraded in situ gelable polymers is introduced into a desired location, e.g., a formation and/or structure and/or reservoir, such as by pumping said solution or composition downhole, the one or more degraded in situ gelable polymers may Balm a gel. In some embodiments, the increase in viscosity and/or gel formation may be a result of the conditions downhole, such as, for example, an increased temperature downhole as compared to the temperature on the surface at which said solution or composition comprising said one or more degraded in situ gelable polymers was prepared for injection. In some embodiments, said gel formation may occur after a desired amount of time. In some embodiments, said gel formation may occur after 5 days or less, 5 days or more, 6 days or more, 7 days or more, 8 days or more, 9 days or more, 10 days or more, 11 days or more, 12 days or more, 13 days or more, 14 days or more, 3 weeks or less, 3 weeks or more, 4 weeks or more, 5 weeks or more, 6 weeks or more, 7 weeks or more, or 8 weeks or more. In some embodiments, after gelation the resultant gelation viscosity or gel strength of a gel formed by a degraded in situ gelable polymer may approximate that of a non-degraded GPAM gel, e.g., a non-degraded GPAM gel wherein the GPAM polymer had a molecular weight from about 10 million to about 15 million. In some embodiments, the resultant gelation viscosity or gel strength and the non-degraded glyoxalated polyacrylamide ("GPAM") gelation viscosity or gel strength may be about $10^2$ cPs or less, about $10^2$ cPs or more, about $10^3$ cPs or more, about $10^4$ cPs or more, or about $10^5$ cPs or more. In some embodiments, the temperature on the surface, i.e., wherein said degraded in situ gelable polymers are prepared is about 25° C. In some embodiments, the temperature of the desired location, e.g., reservoir and/or structure and/or formation into which one or more degraded in situ gelable polymers may be introduced, may be about 30° C. or less, 30° C. or more, 40° C. or more, 50° C. or more, 60° C. or more, 70° C. or more, 80° C. or more, 90° C. or more, 100° C. or more, 110° C. or more, or about 120° C. or more. In some embodiments, an increase in temperature may promote gelation of said one or more degraded in situ gelable polymers. In some embodiments, one or more degraded in situ gelable polymers may form a gel once in a desired location, such as for example, once in a desired structure and/or formation and/or location downhole, and, once said gel is formed, said gel may be stable for 1 month or less, 1 month or more, 2 months or more, 3 months or more, 4 months or more, 5 months or more, or 6 months or more, e.g., about 1-2 months. In some embodiments, one or more degraded in situ gelable polymers may form a gel once in a desired location, such as for example, once in a desired structure and/or formation and/or location downhole, and, once said gel is formed, said gel may be stable for the lifetime of the structure and/formation and/or location. In some embodiments, one or more in situ gelable polymers may comprise one or more dialdehyde groups, and the dialdehyde groups may participate in crosslinks that may thereby promote gel formation once said one or more degraded in situ gelable polymers are present in a desired location. In some embodiments, one or more degraded in situ gelable polymers may be glyoxalated, and the glyoxal groups may participate in crosslinks that may thereby promote gel formation once said one or more degraded in situ gelable polymers are present in a desired location. In some embodiments, some gelation of the degraded in situ gelable polymer containing solution or composition may occur prior to its introduction into a desired location where in situ gelation is desired.

In some embodiments, the pH of a solution or composition comprising one or more degraded in situ gelable polymers may influence the solution-gelation transition of said solution or composition and/or effect the increase in viscosity and/or the rate of gel formation of the one or more degraded in situ gelable polymers. In some embodiments, the pH of a solution or composition comprising one or more degraded in situ gelable polymers may be from about 6.5 to about 8.5, e.g., in some instances the solution or composition comprising the one or more degraded in situ gelable polymers may comprise a pH of about 7.8 or may comprise a pH of about 8.2. In some embodiments, the more alkaline and/or basic the pH of a solution or composition comprising the degraded one or more in situ gelable polymers, the shorter the duration of time required for an increase in viscosity and/or gel formation to occur in said solution and/or composition. In some embodiments, the more alkaline and/or basic the pH of a solution or composition comprising one or more degraded in situ gelable polymers, the longer the duration of time for an increase in viscosity and/or gel formation to occur in said solution and/or composition. In some embodiments, any one of the molecular weight of one or more in situ gelable polymers or degraded in situ gelable polymers, the polymeric formulation of said one or more polymers, the crosslinker dosage, e.g., glyoxal dosage, and/or the solution alkalinity levels may effect the solution gelation transition of one or more degraded in situ gelable polymers.

In some embodiments, a method of enhanced oil recovery may comprise the use of one or more degraded in situ gelable polymers as conformation control agents. In some embodiments, one or more degraded in situ gelable polymers may be used as mobility control agents. In some embodiments, an aqueous composition or aqueous solution comprising one or more degraded in situ gelable polymers may be able to enter formations of 10 darcies or more, 10 darcies or less, 5 darcies or less, 1 darcy or less, or about 0.5 darcies or less.

In some embodiments, a method of enhanced oil recovery may comprise introduction of one or more degraded in situ gelable polymers into a desired location as a part of a polymer flood. In some embodiments, a method of enhanced oil recovery may comprise a. introduction of one or more degraded in situ gelable polymers into a desired location, b. gelation of said one or more degraded in situ gelable polymers, thereby forming a gel in said desired location, and c. performing one or more polymer floods and/or one or more waterfloods. In some embodiments, a method of enhanced oil recovery may comprise a. performing one or more polymer floods and/or water floods; b. introducing one or more degraded in situ gelable polymers into a desired location, optionally as a part of a polymer flood, c. gelation of said one or more degraded in situ gelable polymers, thereby forming a gel in said desired location, and d. after gel formation, performing one or more polymer floods and/or one or more waterfloods. In such instances, the gels formed by said one or more degraded in situ gelable polymers may enhance oil recovery by directing the polymer flood and/or the waterflood to unswept locations and/or formations and/or structures, which may thereby increase sweep efficiency. In some embodiments, one or more degraded in situ gelable polymers may form a gel when being used as a conformation control agent. In some embodiments, one or more degraded in situ gelable polymers may be introduced into a desired location by use of a pump configured to pump the one or more polymers, and/or a solution or composition comprising, through fluid conduits which are disposed in an injection wellbore and downhole.

In some embodiments, a method of enhanced oil recovery may comprise use of one or more degraded in situ gelable polymers, wherein said one or more polymers are used for post waterflood mobility control, i.e., as mobility control agents. In some embodiments, a method of enhanced oil recovery may comprise use of one or more degraded in situ gelable polymers, and/or a solution and/or composition comprising, to aid in oil recovery from low permeable (less than 10 mD) reservoirs, such as sandstone reservoirs, and/or heterogenous reservoirs, such as reservoirs that may mostly be carbonate. In some embodiments, in such a method, use of said one or more degraded in situ gelable polymers may increase sweep efficiency and/or increase oil recovery as compared to a method of enhanced oil recovery that does not comprise use of said one or more degraded in situ gelable polymers. In some embodiments, a method of enhanced oil recovery comprises introduction of one or more degraded in situ gelable polymers, such as introduction of an aqueous solution and/or aqueous composition comprising said one or more polymers, into a desired location, wherein said desired location is a natural fracture or a vug, and, once in said desired location, the one or more degraded in situ gelable polymers form a gel. Such gel formation my increase profile control efficiency as compared to a method that did not comprise use of said one or more degraded in situ gelable polymers. In some embodiments, a method of enhanced oil recovery may comprise a. introduction of one or more degraded in situ gelable polymers into a desired location; b. formation of a gel comprising said one or more degraded in situ gelable polymers, and c. after gel formation, effecting one or more polymer floods and/or waterfloods, wherein the oil recovery effected by said one or more polymer floods and/or one or more waterfloods is increased as a result of the gels formed by said one or more degraded in situ gelable polymers as compared to a method which did not comprise use of said one or more degraded in situ gelable polymers. In some embodiments, a method of enhanced oil recovery may comprise a. performing one or more polymer floods and/or water floods; b. introducing one or more degraded in situ gelable polymers into a desired location; c. gelation of said one or more degraded in situ gelable polymers, and c. after gel formation, effecting one or more polymer floods and/or waterfloods, wherein the oil recovery effected by said one or more polymer floods and/or one or more waterfloods is increased as a result of the gels formed by said one or more polymers as compared to a method which did not comprise use of said one or more degraded in situ gelable polymers.

In some embodiments, one or more degraded in situ gelable polymers may be used in an enhanced oil recovery technique that may primarily targets bypassed oil. In some embodiments, said one or more degraded in situ gelable polymers may be added to injection water for waterflooding and/or polymer flooding. In some embodiments, said one or more degraded in situ gelable polymers may serve as water-shutoff, conformance control, and/or mobility control agents. In some embodiments, said one or more degraded in situ gelable polymers may divert injected fluid away from thief zones and into adjacent matrix rock or low-permeability zones, thereby increasing macroscopic sweep efficiency and improving hydrocarbon recovery. In some embodiments, use of one or more degraded in situ gelable polymers in EOR methods may result in a decrease in water production in water and gas shutoff, fluid loss control, zone abandonment, water and gas coning, squeeze and recompletion, chemical liner completions and lost circulation during drilling operations and plugging during drilling and drilling completion.

In some embodiments, compositions and methods comprising one or more degraded in situ gelable polymers may be used in conjunction with enhanced oil recovery techniques and processes. Said one or more degraded in situ gelable polymers may improve the overall macroscopic sweep efficiency, may improve and/or increase hydrocarbon production, and may decrease associated water production. Said one or more degraded in situ gelable polymers may generally be used for in processes and techniques related to conformance control as a conformance control agent. Also, said degraded in situ gelable one or more polymers may generally comprise permeability reduction capabilities and may enable the strategic plugging of high-permeability channels. Said plugging may divert flooding fluid to relatively unswept adjacent low-permeability zones.

In some embodiments, one or more degraded in situ gelable polymers may be used as a part of any method and/or process related to enhanced oil recovery and/or conformance control and/or mobility control. In some embodiments, said one or more degraded in situ gelable polymers may be used as a part of methods and/or processes involving conformance control, water shutoff, drill fluids, and/or permeability control. In some embodiments, said one or more degraded in situ gelable polymers may be used in methods for improving production from an oil, wherein said methods may comprise: (i) providing a formulation comprising one or more degraded in situ gelable polymers, and delivering the formulation into the oil well, whereby the formulation improves production from the well. In some embodiments, said one or more degraded in situ gelable polymers may be used in methods for water blocking or water shutoff in an oil well, wherein said methods comprise (i) providing a formulation comprising one or more degraded in situ gelable polymers or a composition as described herein, and (ii) delivering the formulation into the oil well, whereby the formulation provides water blocking or water shutoff in the well.

Further, in some embodiments, one or more degraded in situ gelable polymers may be used in a method of enhancing oil recovery from an oil source, comprising (i) providing a formulation comprising one or more degraded in situ gelable polymers or a composition containing as discussed herein, and (ii) delivering the formulation into the oil source, whereby the formulation enhances oil recovery from the oil source. Additionally, in some embodiments, said one or more degraded in situ gelable polymers may be used in a method of treating a petroleum-containing formation to reduce sand production, comprising: (i) providing a formulation comprising one or more degraded in situ gelable polymers or a composition containing as discussed herein, and (ii) delivering said one or more degraded in situ gelable polymers or composition containing into the petroleum-containing formation, whereby the formulation reduces sand production in the formation. Furthermore, in some embodiments, said one or more degraded in situ gelable polymers may be used in a method of displacing fluid from a wellbore by viscous plug flow, comprising: (i) providing one or more degraded in situ gelable polymers or a composition containing as discussed herein, and (ii) delivering the one or more degraded in situ gelable polymers into a wellbore, whereby the formulation forms a viscous plug in the wellbore, thereby displacing fluid therefrom.

In some embodiments, a method of enhanced oil recovery may comprise: (i) obtaining or providing a composition comprising one or more degraded in situ gelable polymers; (ii) placing the composition in a subterranean formation downhole; and (iii) extracting material comprising petroleum from the subterranean formation downhole via a production wellbore. In some embodiments, gelation of the one or more degraded in situ gelable polymers may occur in a subterranean formation. In some embodiments, during said method, the composition comprising one or more degraded in situ gelable polymers is placed downhole via an injection wellbore. In some embodiments of a method comprising use of one or more degraded in situ gelable polymers, extraction may be effected using a production wellbore. In some embodiments of a method comprising use of the one or more degraded in situ gelable polymers discussed herein, a composition comprising said one or more polymers may be placed in the subterranean formation downhole comprises placing the composition in a producing zone downhole, and wherein the extracting of the material comprising petroleum from the subterranean formation downhole comprises extracting of the material from the producing zone.

Additionally, in some embodiments, a method for remediation of a zone within a subterranean formation bearing heavy/viscous oil to inhibit breakthrough of water from a water injection well via the zone into a production well, the zone comprised of a void space, a halo region, or both, within the zone due to production of the heavy/viscous oil through the production well, the zone thereby allowing for pressure communication between the injection well and the production well, may comprise: (i) injecting a composition into the zone via the injection well, the composition comprising one or more degraded in situ gelable polymers or a composition as described herein; (ii) allowing the one or more degraded in situ gelable polymers to set for a time sufficient to thereby form a plug which reduces flow communication of water between the injection well and the production well. In some embodiments of said method, the displacement fluid is selected from water, alcohols, fuel oil or crude oil. In some embodiments of said method, the displacement fluid is water.

Due to the characteristics of the one or more degraded in situ gelable polymers, such as the low, in some instances near water-like, viscosity of a solution or composition comprising said one or more polymers at the time of injection, these polymers and compositions containing can propagate far into a reservoir. In some embodiments, one or more degraded in situ gelable polymers and/or a composition comprising may be added to injection water as part of a secondary or tertiary water recovery process, carbon dioxide injection, chemical, or air injection for recovery of hydrocarbon from subterranean sandstone or carbonate formation. This may allow for control of the near well-bore and in-depth formation conformance vertically and laterally by selectively blocking the high water channels.

In some embodiments, methods for enhanced oil recovery which comprise the use of one or more degraded in situ gelable polymers may provide for any one or more of the following non-limiting examples of advantages as compared to methods which did not comprise use of said one or more degraded in situ gelable polymers: 1. the desired polymer molecular weight that results in a desired viscosity of a solution comprising one or more degraded in situ gelable polymers may be achieved through use of one or more degradation agents and one or more DPAMs; 2. use of said one or more degraded in situ gelable polymers in a solution or composition for enhanced oil recovery provides a solution or composition with a reduced bulk viscosity as compared to conventional polymers that may be used in instances where in situ gelable polymers may be used, such as, for example, as a conformance control agent, a mobility control agent, as a part of a polymer flood, etc.; 3. use of said one or more degraded in situ gelable polymers provides for a time-controllable in situ gelable system 4. on-site preparation of the one or more degraded in situ gelable polymers, such as on-site glyoxalation, on site degradation, etc.; 5. the one or more degraded in situ gelable polymers can be implemented in batch process mode at a user site with standard equipment, i.e., without the need for specialized equipment; 6. as the one or more degraded in situ gelable polymers can be prepared on-site using DPAM, the use of such DPAMs allows for improved logistics of both cost and product robustness for various different climate conditions; 7. improved injectivity, especially for low permeability reservoirs, for methods comprising use of said one or more degraded in situ gelable polymers as compared to methods comprising the use of standard compositions, e.g., standard HPAM comprising compositions, and/or methods not comprising use of said one or more degraded in situ gelable polymers; and 8. gels that are formed by the one or more degraded in situ gelable polymers at the desired location and at the desired time may be stable for at least one month under aerobic reservoir conditions, and may generally be stable for many months, or, depending on the reservoir conditions, indefinitely.

Moreover, the present disclosure generally relates to a composition suitable for use in EOR, such as, for example, as a conformance control agent, as a mobility control agent, for post water flood mobility control, to increase sweep efficiency, etc., wherein said composition comprises one or more degraded in situ gelable polymers and an aqueous fluid. Such a composition may be used, for example, in any of the methods discussed herein. In some embodiments, said composition may be suitable for use in polymer flooding. In some embodiments, said composition may be suitable for use as a conformance control agent. In some embodiments, said composition may be suitable for use as a mobility control agent.

In some embodiments, at least one of said one or more degraded in situ gelable polymers may comprise one or more acrylamide monomers. In some embodiments, at least one of said one or more degraded in situ gelable polymers may comprise one or more anionic monomers. Said one or more anionic monomers may comprise, but are not limited to comprising, any one or more of the following: acrylic acid, beta-carboxyethyl acrylate, sodium 1-allyloxy-2-hydroxy propane sulphonate, 3-Allyloxy-2-hydroxypropane sulfonate sodium salt, vinylsulfonic acid sodium salt. acrylamide tertiary butyl sulfonic acid (also known as 2-acrylamido-2-methylpropane sulfonic acid or N-t-butyl acrylamide sulfonic acid) ("ATBS"); vinylsulfonic acid; 4-styrenesulfonic acid. In some embodiments, at least one of said one or more degraded in situ gelable polymers may comprise one or more acrylamide monomers and one or more anionic monomers. In some embodiments, at least one of said one or more degraded in situ gelable polymers may comprise one or more acrylamide monomers and one or more acrylic acid monomers. In some embodiments, at least one of said one or more degraded in situ gelable polymers may comprise one or more anionic monomers, including but not limited to: acrylic acid, beta-carboxyethyl acrylate, sodium 1-allyloxy-2-hydroxy propane sulphonate, 3-Allyloxy-2-hydroxypropane sulfonate sodium salt, vinylsulfonic acid sodium salt. acrylamide tertiary butyl sulfonic acid (also known as 2-acrylamido-2-methylpropane sulfonic acid or N-t-butyl acrylamide sulfonic acid) ("ATBS");

vinylsulfonic acid; 4-styrenesulfonic acid. In some embodiments, at least one of said one or more degraded in situ gelable polymers may comprise from about 5 mol percent to about 40 mol percent of one or more anionic monomers, e.g., one or more acrylic acid monomers. In some embodiments, at least one of said one or more degraded in situ gelable polymers may comprise at least one of said one or more degraded in situ gelable polymers may comprise a terpolymer, for example, a terpolymer comprising one or more acrylamide monomers, one or more acrylic acid monomers, and one or more anionic monomers, e.g., ATBS. Said one or more anionic monomers may be about 1 mol % to about 10 mol % of said terpolymer, and, in some instances, may replace acrylamide that would otherwise be present if said terpolymer was a copolymer. In some embodiments, at least one of said one or more degraded in situ gelable polymers may comprise about 70 mol % acrylamide and about 30% acrylic acid. In some embodiments, at least one of said one or more degraded in situ gelable polymers may comprise about 90 mol % acrylamide and about 10% acrylic acid. In some embodiments, at least one of said one or more degraded in situ gelable polymers may comprise about 70 mol % acrylamide and about 30% acrylic acid, and may further comprise one or more dialdehyde groups, optionally wherein said dialdehyde groups are post-added. Examples of dialdehyde groups include but are not limited to including glyoxal, malondialdehyde, succindialdehyde, glutaraldehyde, adipaldehyde, o-phthaldehyde, m-phthaldehyde, p-phthaldehyde, any suitable dialdehyde compound, and mixtures thereof. In some embodiments, at least one of said one or more degraded in situ gelable polymers may comprise glyoxal groups, wherein the glyoxal groups may be introduced through any known glyoxalation reaction.

In some embodiments, a composition comprising one or more degraded in situ gelable polymers may be prepared by (i) providing one or more polyacrylamide-based polymers, wherein said polymers optionally comprises one or more acrylamide monomers and one or more acrylic acid monomers; (ii) contacting an aqueous solution or aqueous composition, such as a brine, with said one or more polymers; (iii) contacting said aqueous solution or composition with one or more degradation agents, which degrade said one or more polymers into one or more polymers comprising reduced molecular weight fragments; (iv) contacting said aqueous solution or composition with one or more crosslinkers comprising a dialdehyde; (v) optionally adjusting the pH of said solution or composition to a desired value by adding one or more buffers, such as an alkaline buffer. In some embodiments, a composition comprising one or more degraded in situ gelable polymers may be prepared by (i) providing one or more polyacrylamide-based polymers, wherein said polymers optionally comprises one or more acrylamide monomers and one or more acrylic acid monomers; (ii) contacting an aqueous solution or aqueous composition, such as a brine, with said one or more polymers; (iii) contacting said aqueous solution or composition with one or more degradation agents, which degrade said one or more polymers into one or more polymers comprising reduced molecular weight fragments; (iv) contacting said aqueous solution or composition with glyoxal and/or a glyoxalating agent; (v) optionally adjusting the pH of said solution or composition to a desired value by adding one or more buffers, such as an alkaline buffer. In some embodiments, the polyacrylamide-based polymer of step (i) may be a DPAM and/or an HPAM. In some embodiments, step (iv) occurs before, during, or after step (iii). In some embodiments, step (iii) occurs before step (iv), and optionally wherein an incubation period occurs after step (iii) and before step (iv). In some embodiments, step (iv) occurs before step (iii). In some embodiments, step (iv) occurs during step (iii). In some embodiments, step (iv) occurs after step (iii). In some embodiments, step (v) occurs after steps (i)-(iv). In some embodiments, step (iv) occurs before and during step (iii). In some embodiments, step (iv) occurs during and after step (iii). In some embodiments step (iv) occurs before, during, and after step (iii). In some embodiments, step (iv) comprises adding 5 wt % or less, 10 wt % or less, 15 wt % or less, 20 wt % or less, 25 wt % or less, 30 wt % or less, 35 wt % or less, 40 wt % or less, 45 wt % or less, 50 wt % or less, 55 wt % or less, 60 wt % or less, 65 wt % or less, 70 wt % or less, 75 wt % or less, 80 wt % or less, or 80 wt % or more of said one or more crosslinkers to said aqueous solution or aqueous composition. In some embodiments, step (iv) comprises adding 5 wt % or less, 10 wt % or less, 15 wt % or less, 20 wt % or less, 25 wt % or less, 30 wt % or less, 35 wt % or less, 40 wt % or less, 45 wt % or less, 50 wt % or less, 55 wt % or less, 60 wt % or less, 65 wt % or less, 70 wt % or less, 75 wt % or less, 80 wt % or less, or 80 wt % or more of one or more glyoxal groups to said aqueous solution or aqueous composition. In some embodiments, the wt % may be a dry weight percentage. In some embodiments, at least one of said one or more polyacrylamide-based polymers of step (i) has a molecular weight of about 10 million Da or less, about 11 million Da or less, about 12 million Da or less, about 13 million Da or less, about 14 million Da or less, about 15 million Da or less, or about 15 million Da or more. In some embodiments, step (iii) results in at least one of said one or more polymers having a molecular weight of about 1 million Da or less, about 2 million Da or less, about 3 million Da or less, about 4 million Da or less, about 5 million Da or less, about 6 million Da or less, or about 6 million Da or more. In some embodiments, steps (i)-(v) occur onsite, i.e., at a location where said composition is intended for use. In some embodiments, the amount of degradation agent added may be any amount that results in a desired molecular weight of polymer. In some embodiments, the amount of degradation agent added may about 50 ppm or less, about 75 ppm or less, about 80 ppm or less, about 100 ppm or less, about 125 ppm or less, about 150 ppm or less, about 175 ppm or less, about 200 ppm or less, about 250 ppm or less, about 300 ppm or less, about 350 ppm or less, about 400 ppm or less, about 450 ppm or less, about 500 ppm or less, or about 500 ppm or more. In some embodiments, step (v) may comprise adjusting the pH of the solution or composition to a value of about 6.5 to about 8.5.

In some embodiments, a composition comprising one or more degraded in situ gelable polymers may be about an 0.5% active solution or composition, i.e., comprise about 0.5% of active degraded in situ gelable polymer. In some embodiments, the viscosity of a composition which comprises one or more degraded in situ gelable polymer may have a viscosity similar to that of water prior to introduction of said solution or composition into a desired location, such as being introduced to a formation downhole. In some embodiments, the viscosity of a composition which comprises one or more degraded in situ gelable polymer may be about 5 cPs or less, about 6 cPs or less, about 7 cPs or less, about 8 cPs or less, about 9 cPs or less, about 10 cPs or less about 12.5 cPs or less, about 15 cPs or less, about 20 cPs or less, about 25 cPs or less, about 30 cPs or less, about 35 cPs or less, about 40 cPs or less, about 45 cPs or less, about 50 cPs or less, about 55 cPs or less, about 60 cPs or less, about 65 cPs or less, about 70 cPs or less, about 75 cPs or less, about 80 cPs or less, about 85 cPs or less, about 90 cPs or less, about 95 cPs or less, about 100 cPs or less, or about 100 cPs or more prior to introduction of said solution or composition into a desired location. In some embodiments, the viscosity of an aqueous solution or aqueous composition which comprises one or more degraded in situ gelable polymer may be about $10^2$ cPs or less, about $10^2$ cPs or more, about $10^3$ cPs or more, about $10^4$ cPs or more, or about $10^5$ cPs or more, a desired amount of time following introduction of said solution or composition into a desired location. In some embodiments, after a composition comprising one or more degraded in situ gelable polymers is introduced into a desired location, such as by pumping said solution or composition downhole, the solution or composition comprising may increase in viscosity relative to its viscosity prior to introduction. In some embodiments, after a composition comprising one or more degraded in situ gelable polymers is introduced into a desired location, e.g., a formation and/or structure and/or reservoir, such as by pumping said solution or composition downhole, the one or more degraded in situ gelable polymers may form a gel. In some embodiments, the increase in viscosity and/or gel formation may be a result of the conditions downhole, such as, for example, an increased temperature downhole as compared to the temperature on the surface at which said solution or composition comprising said one or more degraded in situ gelable polymers was prepared for injection. In some embodiments, said gel formation may occur after a desired amount of time. In some embodiments, said gel formation may occur after 5 days or less, 5 days or more, 6 days or more, 7 days or more, 8 days or more, 9 days or more, 10 days or more, 11 days or more, 12 days or more, 13 days or more, 14 days or more, 3 weeks or less, 3 weeks or more, 4 weeks or more, 5 weeks or more, 6 weeks or more, 7 weeks or more, or 8 weeks or more. In some embodiments, the temperature on the surface, i.e., wherein said degraded in situ gelable polymers are prepared is about 25° C. In some embodiments, the temperature of the reservoir and/or structure and/or formation into which one or more degraded in situ gelable polymers may be introduced may be about 30° C. or less, 30° C. or more, 40° C. or more, 50° C. or more, 60° C. or more, 70° C. or more, 80° C. or more, 90° C. or more, 100° C. or more, 110° C. or more, or about 120° C. or more. In some embodiments, an increase in temperature may promote gelation of said one or more degraded in situ gelable polymers. In some embodiments, one or more degraded in situ gelable polymers may form a gel once in a desired location, such as for example, once in a desired structure and/or formation and/or location downhole, and, once said gel is formed, said gel may be stable for 1 month or less, 1 month or more, 2 months or more, 3 months or more, 4 months or more, 5 months or more, or 6 months or more. In some embodiments, one or more degraded in situ gelable polymers may form a gel once in a desired location, such as for example, once in a desired structure and/or formation and/or location downhole, and, once said gel is formed, said gel may be stable for the lifetime of the structure and/formation and/or location. In some embodiments, one or more in situ gelable polymers may comprise one or more dialdehyde groups, and the dialdehyde groups may participate in crosslinks that may thereby promote gel formation once said one or more degraded in situ gelable polymers are present in a desired location. In some embodiments, one or more degraded in situ gelable polymers may be glyoxalated, and the glyoxal groups may participate in crosslinks that may thereby promote gel formation once said one or more in situ gelable polymers are present in a desired location. In some embodiments, a composition comprising one or more in situ gelable polymers may not form a gel prior to introduction into a desired location, i.e., said solution or composition may not form a gel when at normal/standard above-ground conditions. In some embodiments, some gelation of the degraded in situ gelable polymer containing solution or composition may occur prior to its introduction into a desired location where in situ gelation is desired. In some embodiments, after gelation, the resultant gelation viscosity or gel strength of a gel formed by a degraded in situ gelable polymer may approximate that of a non-degraded GPAM gel, e.g., a non-degraded GPAM gel wherein the GPAM polymer had a molecular weight from about 10 million to about 15 million. In some embodiments, the resultant gelation viscosity or gel strength and the non-degraded glyoxalated polyacrylamide ("GPAM") gelation viscosity or gel strength may be about $10^2$ cPs or less, about $10^2$ cPs or more, about $10^3$ cPs or more, about $10^4$ cPs or more, or about $10^5$ cPs or more.

In some embodiments, the pH of a composition comprising one or more degraded in situ gelable polymers may influence the solution-gelation transition. In some embodiments, the pH of a solution or composition comprising one or more degraded in situ gelable polymers may be from about 6.5 to about 8.5, e.g., 7.8 or 8.2. In some embodiments, the more alkaline and/or basic the pH of a solution or composition comprising degraded one or more in situ gelable polymers, the shorter the duration of time for an increase in viscosity and/or gel formation to occur in said solution and/or composition. In some embodiments, the more alkaline and/or basic the pH of a solution or composition comprising one or more degraded in situ gelable polymers, the longer the duration of time for an increase in viscosity and/or gel formation to occur in said composition. In some embodiments, any one of the molecular weight of one or more degraded in situ gelable polymers, the polymeric formulation of said one or more polymers, the crosslinker dosage, e.g., glyoxal and/or crosslinker dosage, and/or the solution alkalinity levels may effect the solution gelation transition of one or more degraded in situ gelable polymers. In some embodiments, a composition comprising one or more degraded in situ gelable polymers may be able to enter formations of 10 darcies or more, 10 darcies or less, 5 darcies or less, 1 darcy or less, or about 0.5 darcies or less. In some embodiments, said composition may be substantially free of oxygen. In some embodiments, said composition may be sparged, e.g., sparged with nitrogen. In some embodiments, said composition may comprise one or more oxygen scavengers, e.g., one or more compounds comprising sulfite and/or bisulfite.

EXAMPLES

Example 1: Polymer Comparison

In this example, a sample comprising a degraded in situ gelable polymer ("Polymer A") was prepared and compared to a sample comprising degraded polyacrylamide-based polymer ("Polymer B"), and to a sample comprising polyacrylamide-based polymer ("Polymer C"). Sample of Polymer A was prepared as follows. Dry polyacrylamide-based polymer, which comprised an average mole ratio of 70:30 acrylamide:acrylic acid, was dissolved in Pluspetrol MS brine that contained 80 ppm degradation agent (iron II sulfate). Next, 35% weight glyoxal of the total polymer weight, and an amount of alkaline buffer that resulted in a desired pH value, were added to the sample, thereby producing a sample of Polymer A. Sample of Polymer B was prepared by dissolving dry polyacrylamide-based polymer, which comprised an average mole ratio of 70:30 acrylamide:acrylic acid, in Pluspetrol MS brine that contained 80 ppm degradation agent (iron II sulfate). Sample of Polymer C was prepared by dissolving dry polyacrylamide-based polymer, which comprised an average mole ratio of 70:30 acrylamide:acrylic acid in Pluspetrol MS brine. The preparation of both Polymer B and Polymer C resulted in an 0.5% active solution, and the preparation of Polymer A resulted in an 0.57% active solution.

Following their preparation, samples of Polymer A, Polymer B, and Polymer C were compared to one another (see Table 1). The viscosity of each of the Polymer A, Polymer B, and Polymer C samples were measured by a Brookfield viscometer.

| Polymer Sample | Bulk Viscosity (cPs) | Solution pH |
|---|---|---|
| Polymer A (Degraded solution with 35 wt % glyoxal (0.57% total active)) | 20 | 7.01 |
| Polymer B (Iron(II) degraded solution (0.5% active)) | 21 | 7.6 |
| Polymer C (0.5% active solution) | 52 | 7.8 |

The results presented in Table 1 demonstrated that the sample of Polymer A had a lower viscosity value and lower solution pH as compared to the samples of both Polymer B and Polymer C.

Example 2: Polymer Gelation

In this example, the solution-gelation transition time, and gel strength, of two different samples (Sample 1 and Sample 2) of Polymer A were measured. Sample 1 of Polymer A was prepared as described in Example 1, with the exception that the pH of Sample 1 was adjusted to 7.8 by addition of an alkaline buffer. Sample 2 of Polymer A was prepared as described in Example 1, with the exception that the pH of Sample 2 was adjusted to 8.2 by addition of an alkaline buffer. Following preparation of Sample 1 and Sample 2 of Polymer A, each sample was aged in an oven at 38° C. During the aging of the samples, the viscosity of Sample 1 and Sample 2 were measured at 24 hour intervals (see FIG. 1). A third sample, Sample 3, which was prepared following the above procedure for Polymer A, with the exception that no degradation agent was present in the preparation, was used as a control by aging the sample in the same manner as for Samples 1 and 2, and the resulting gel was used for the measurements of FIG. 2 discussed below.

Referring now to FIG. 1, the data of FIG. 1 demonstrated that the pH of the solution affected the solution gel transition. The data of FIG. 1 further demonstrated that Sample 1 formed gels within 8 days under the simulated brine reservoir conditions, and that Sample 2 formed gels within 5 days under the simulated brine reservoir conditions. It was further observed that the gels of Sample 1 and Sample 2 were thermally stable for greater than one month inside the simulated brine reservoir conditions under the elevated temperature (38° C.) environment.

After formation of gels by Sample 1, Sample 2, and Sample 3, the gel strengths of each was evaluated using an Anton Paar viscometer. Plate geometry was used to measure Sample 1, Sample 2, and Sample 3 gel viscosities at low shear rate, $0.1\ s^{-1}$, and typical reservoir shear rate, $7^{s-1}$. Rheology measurements were performed at 38° C.

Figure 2:
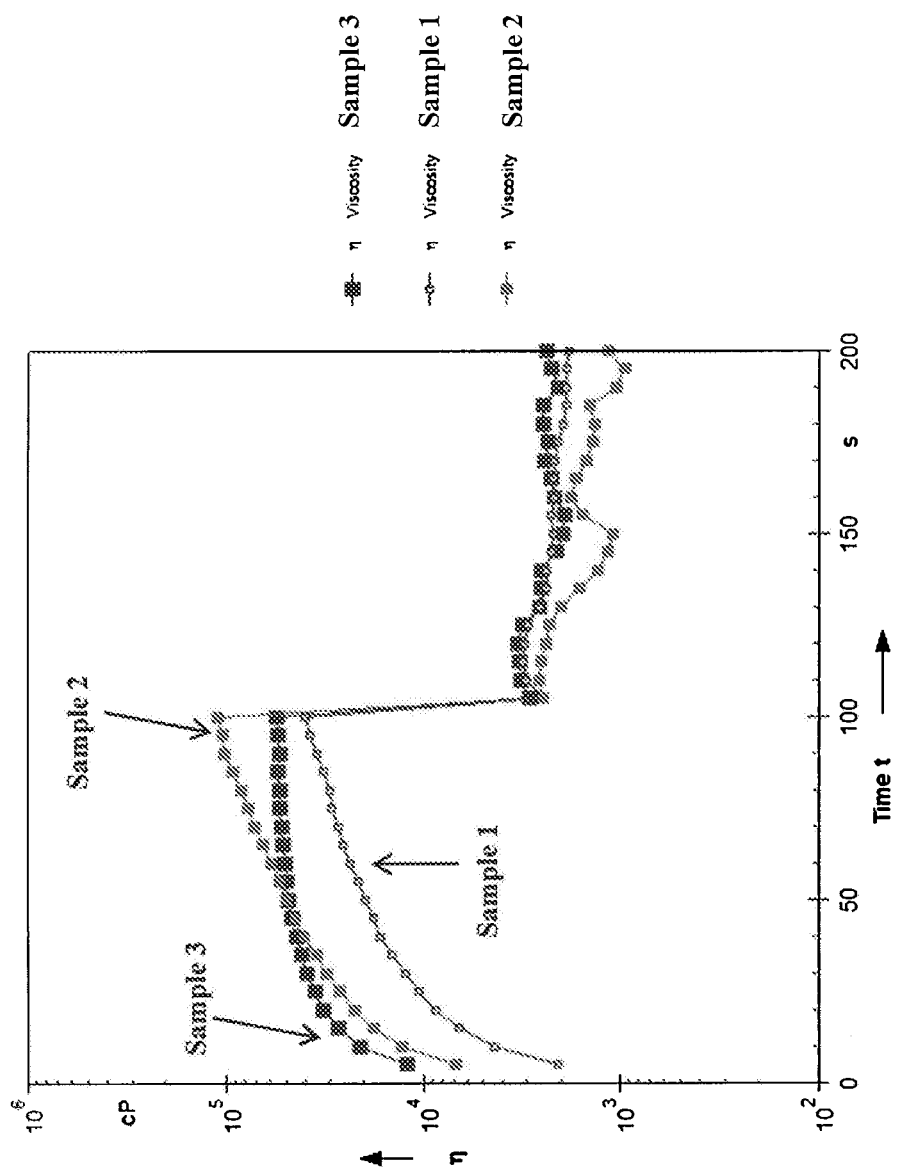
FIG. 2 illustrates viscosity measurements that were taken at two different shear rates in accordance with Example 2.

Referring now to FIG. 2, Sample 1 and Sample 2 demonstrated similar gel strength values a compared to the gel formed by Sample 3 under both shear rate conditions. For example, Samples 1, 2, and 3 all demonstrated greater than $10^4$ cPs at the low shear rate, and greater than $10^3$ cPs at the high shear rate.

In the preceding procedures, various steps have been described. It will, however, be evident that various modifications and changes may be made thereto, and additional procedures may be implemented, without departing from the broader scope of the procedures as set forth in the claims that follow.

The invention claimed is:

1. A method of enhanced oil recovery, comprising:
   a. introducing one or more in situ gellable polymers into a desired zone comprised in an environment comprising heavy/viscous oil, wherein said in situ gellable polymers comprise acrylamide and acrylic acid or methacrylic acid monomers, by contacting said in situ gellable polymers which are present in said desired zone with a degradation effective amount of an iron-based degradation agent, which iron-based degradation agent degrades said in situ gellable polymers which are present in said desired zone into one or more degraded in situ gellable polymers comprising reduced molecular weight fragments, wherein said degradation agent comprises iron, an iron compound, or a combination thereof;
   b. further introducing one or more crosslinkers which comprise a glyoxal and/or a glyoxalating agent into said desired zone in step a;
   c. gelating said one or more degraded in situ gellable polymers which are comprised in said desired zone at a pH ranging from 7.8 to 8.2, thereby forming a gel in said desired zone; and
   c. performing one or more polymer floods and/or one or more waterfloods.

2. The method of enhanced oil recovery according to claim 1,
   wherein one or more polymer floods and/or waterfloods are effected after gel formation and oil recovery effected by said one or more polymer floods and/or one or more waterfloods is increased as a result of the gels formed by said one or more degraded in situ gellable polymers as compared to a method which did not comprise use of said one or more degraded in situ gellable polymers.

3. The method of enhanced oil recovery according to claim 1, further comprising:
   (i) further introducing one or more degraded in situ gellable polymers, into the same or a different zone which is comprised in said subterranean formation comprising heavy/viscous oil, wherein said in situ gellable polymers comprise acrylamide and acrylic acid or methacrylic acid monomers,
   (ii) further introducing into said same or different zone in (i), one or more crosslinkers which comprise a glyoxal and/or a glyoxalating agent; and
   (iii) allowing sufficient time for said in situ gellable polymers to set or gel in said same or different zone comprising heavy/viscous oil thereby further enhancing oil recovery.

4. The method of enhanced oil recovery according to claim 1, further comprising
   extracting material comprising petroleum from the subterranean formation downhole via a production wellbore.

5. The method of claim 1, wherein said environment comprising heavy/viscous oil comprises a sandstone reservoir, heterogenous reservoir, or a carbonate reservoir.

6. The method of claim 1, wherein the iron-based degradation agents which comprises iron or an iron containing compound includes one or more of the following: (1) iron (II), iron (II) sulfate, a ferrous compound, a ferrous salt, a ferric compound, a ferric salt, and combinations or mixtures thereof.

7. The method of claim 1, wherein said sellable polymers which comprise acrylamide and acrylic acid or methacrylic acid monomers comprise about 70 mol % acrylamide monomers.

8. The method of claim 1, wherein gelation of said one or more degraded in situ gellable polymers which are comprised in said desired zone is effected at a pH of about 7.8.

9. The method of claim 1, wherein gelation of said one or more degraded in situ gellable polymers which are comprised in said desired zone is effected at a pH of about 8.2.

10. The method of claim 1, said gellable polymers which comprise acrylamide and acrylic acid or methacrylic acid monomers comprise about 70 mol % acrylamide monomers and about 30 mol % acrylic acid.

11. The method of claim 1, said gellable polymers which comprise acrylamide and acrylic acid or methacrylic acid monomers comprise about 90 mol % acrylamide monomers and about 10 mol % acrylic acid.

12. The method of claim 1, wherein the iron-based degradation agents include ferrous salts having an organic anion, ferrous salts having an inorganic anion, ferric salts having an organic anion, ferric salts having an inorganic anion, and combinations or mixtures thereof.

13. The method of claim 1, wherein the iron-based degradation agents include ferric citrate, ferric chloride, ferric bromide, ferric fluoride, ferric sulfate, and combinations or mixtures thereof.

14. The method of claim 1, wherein the iron-based degradation agent further includes ammonium persulfate.

15. A method of enhanced oil recovery which provides for remediation of a zone within a subterranean formation bearing heavy/viscous oil, wherein said remediation of the zone comprises the following steps:

a. injecting into the zone via the injection well, (i) one or more degraded in situ gellable polymers wherein said gellable polymers comprise acrylamide and acrylic acid or methacrylic acid monomers, which are obtained by contacting said gellable polymers under alkaline conditions with (ii) a degradation effective amount of an iron-based degradation agent, which iron-based degradation agent degrades said in situ gellable polymers into one or more degraded gellable polymers comprising reduced molecular weight fragments, wherein said iron-based degradation agent comprises iron, an iron compound, or a combination thereof, b. further introducing one or more one or more crosslinkers which comprise a glyoxal and/or a glyoxalating agent;

c. allowing the one or more degraded gellable polymers which are in said subterranean formation bearing heavy/viscous oil to set or gel for a time sufficient to form a plug which reduces flow communication of water between the injection well and the production well; and d. performing one or more polymer floods and/or one or more waterfloods;

wherein said method provides for remediation of said zone comprised in the subterranean formation bearing heavy/viscous oil by inhibiting the breakthrough of water from a water injection well via the zone into a production well, the zone comprised of a void space, a halo region, or both, due to production of the heavy/viscous oil through the production well, by allowing for pressure communication between the injection well and the production well.

\* \* \* \* \*